United States Patent
Pham et al.

(10) Patent No.: US 9,567,260 B2
(45) Date of Patent: Feb. 14, 2017

(54) SYNTHETIC MICROPARTICLES

(71) Applicant: James Hardie Technology Limited, Dublin (IE)

(72) Inventors: Thinh Pham, Fontana, CA (US); Nandakumar Natarajan, Fontana, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 14/440,249

(22) PCT Filed: Oct. 31, 2013

(86) PCT No.: PCT/US2013/067861
§ 371 (c)(1),
(2) Date: May 1, 2015

(87) PCT Pub. No.: WO2014/071068
PCT Pub. Date: May 8, 2014

(65) Prior Publication Data
US 2015/0315075 A1 Nov. 5, 2015

Related U.S. Application Data

(60) Provisional application No. 61/722,067, filed on Nov. 2, 2012.

(51) Int. Cl.
| | |
|---|---|
| C04B 14/30 | (2006.01) |
| C04B 14/04 | (2006.01) |
| C04B 28/02 | (2006.01) |
| C04B 20/00 | (2006.01) |
| B01J 13/02 | (2006.01) |

(52) U.S. Cl.
CPC ............. *C04B 14/308* (2013.01); *B01J 13/02* (2013.01); *C04B 14/04* (2013.01); *C04B 14/30* (2013.01); *C04B 14/301* (2013.01); *C04B 14/303* (2013.01); *C04B 20/0036* (2013.01); *C04B 28/02* (2013.01)

(58) Field of Classification Search
CPC ........... B01J 13/02; C04B 14/04; C04B 14/30; C04B 14/301; C04B 14/303; C04B 14/308; C04B 20/0036; C04B 28/02
See application file for complete search history.

(56) References Cited

U.S. PATENT DOCUMENTS

| | | | | |
|---|---|---|---|---|
| 4,252,193 | A * | 2/1981 | Powers | C04B 14/24 106/676 |
| 4,983,550 | A * | 1/1991 | Goetz | C03C 3/078 501/33 |
| 6,746,636 | B2 | 6/2004 | Meyer | |
| 6,936,098 | B2 | 8/2005 | Ronin | |
| 7,666,505 | B2 | 2/2010 | Datta et al. | |
| 7,878,026 | B2 | 2/2011 | Datta et al. | |
| 8,163,352 | B2 * | 4/2012 | Jones | B28B 1/08 427/180 |
| 2001/0043996 | A1 * | 11/2001 | Yamada | C03B 19/107 428/34.4 |
| 2002/0004111 | A1 * | 1/2002 | Matsubara | C03C 3/083 428/34.4 |
| 2005/0031703 | A1 * | 2/2005 | Beier | A01N 59/16 424/601 |
| 2011/0152057 | A1 * | 6/2011 | Qi | C03B 19/107 501/39 |
| 2012/0157358 | A1 | 6/2012 | Fang et al. | |

FOREIGN PATENT DOCUMENTS

| | | | |
|---|---|---|---|
| JP | 58-140340 A | * | 8/1983 |
| JP | 07-196363 A | * | 1/1985 |
| JP | 2009-185001 A | * | 8/2009 |
| WO | WO 2014/071068 | | 5/2014 |

OTHER PUBLICATIONS

Sphere One Extendospheres™ SG Hollow Spheres Information Sheet accessed from www.matweb.com. (no date).*
Extendospheres ®SG Hollow Microspheres. Material Safety Data Sheet from Sphere One, Inc. pp. 1-4 (Dec. 1, 2004).*
International Preliminary Report on Patentability and Written Opinion for corresponding PCT Application No. PCT/US2013/067861, filed Oct. 31, 2013, dated Mar. 10, 2014, 12 pages.

* cited by examiner

*Primary Examiner* — Anthony J Green
(74) *Attorney, Agent, or Firm* — Knobbe Martens Olson & Bear LLP

(57) ABSTRACT

Disclosed herein are synthetic microparticles substantially free of monovalent and divalent metal elements and a method of forming such synthetic microparticles. The synthetic microparticle may be suitable for use as a density modifying filler. The synthetic microsphere can be made from an agglomerate precursor that includes an aluminosilicate material, such as fly ash, a blowing agent such as sugar, carbon black, and silicon carbide, and a binding agent. The synthetic microsphere is produced when the precursor is fired at a pre-determined temperature profile so as to form either solid or hollow synthetic microspheres depending on the processing conditions and/or components used. The synthetic microparticle is capable of being formed into a large range of predetermined shapes.

10 Claims, 12 Drawing Sheets

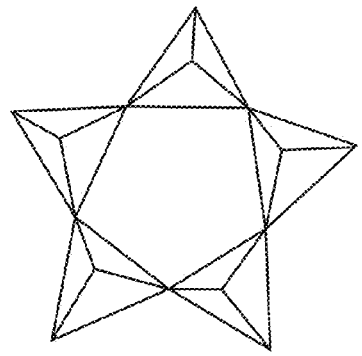 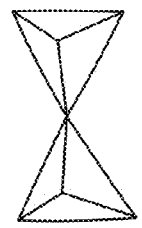 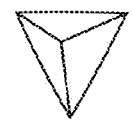
Figure 1(i)   Figure 1(j)   Figure 1(k)
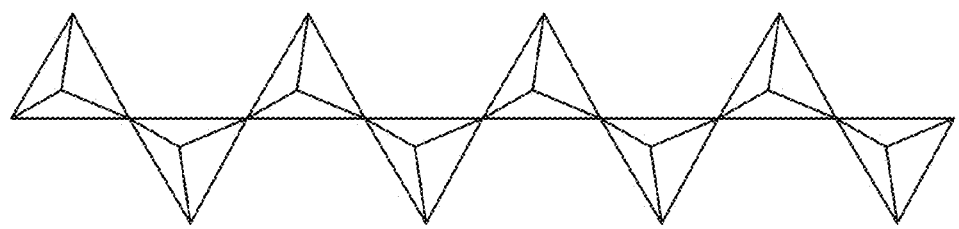
Figure 1(l)
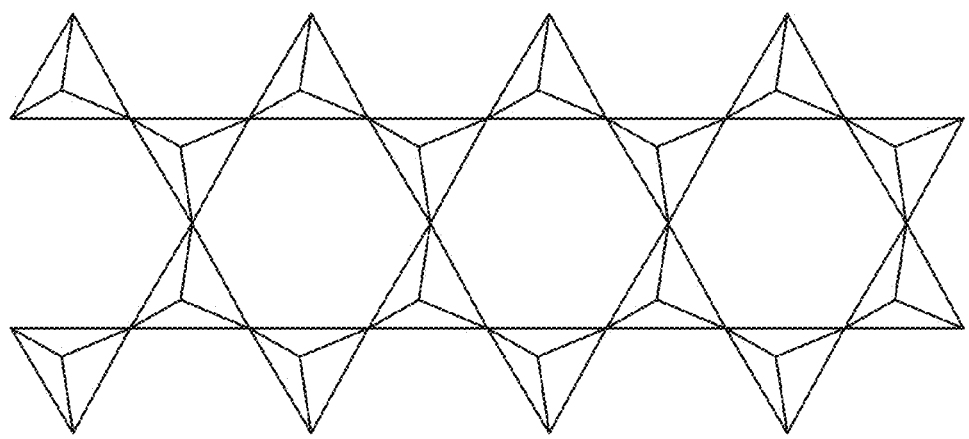
Figure 1(m)

SYNTHETIC MICROPARTICLES

BACKGROUND

Field

The present disclosure relates to synthetic microparticles and in particular to synthetic microparticles in the form of synthetic hollow microspheres.

Description of the Related Art

Any discussion of the prior art throughout the specification should in no way be considered as an admission that such prior art is widely known or forms part of the common general knowledge in the field.

Microparticles in the form of ash particles from the burning of coal in power station furnaces are known. The composition of the ash changes depending on the type of coal being burnt and the combustion efficiency within the furnaces. It is not uncommon for the ash to be contaminated with various levels of soot or unburnt carbonaceous material in periods of high power demand. In this instance a supplier is unable to exercise any direct control over the composition of the product produced.

When considering density modifying particles produced by burning coal in power station furnaces, for example, cenospheres, the yield is low and secondary processing is required to separate these particles from the predominant form of ash. Separation is usually done by flotation on lakes and skimming to harvest the desired form of ash. In many regions where this separation can be performed, harvesting of cenospheres is reduced to being a seasonal operation because the lakes freeze in winter. Furthermore harvested microparticle products contaminated by other undesirable combustion by-products may be unfit for use.

Thus, there is a need for microparticles with improved properties and a method to produce such microparticles.

SUMMARY

According to one embodiment of the disclosure, there is provided a synthetic microparticle comprising a solid phase, wherein the solid phase comprises at least about 60 atomic percent oxygen; about 19 atomic percent to about 25 atomic percent silicon; up to about 3 atomic percent monovalent cations; up to about 3 atomic percent divalent cations; at least about 10 atomic percent trivalent cations; and wherein the ratio of oxygen to silicon atoms is at least about 3. In one implementation, the synthetic microparticle is substantially free of monovalent and divalent metal elements, preferably less than about 6 atomic percent of monovalent and divalent metal elements, thereby allowing the synthetic microparticle to be formed without the vitrifying effects normally associated with microparticles formed with the presence of high divalent ions. In some implementations, examples of suitable monovalent metal cations include Sodium and Potassium; suitable divalent metal cations include Magnesium, Calcium, Strontium and Barium; and suitable trivalent metal cations include Aluminum, Boron, Iron and Yttrium.

According to another embodiment of the disclosure, there is provided a synthetic microparticle comprising about 15% to about 95% $SiO_2$ by weight, about 2% to about 45% $Al_2O_3$ by weight, about 0% to about 4% $Na_2O$ by weight, and about 0.1% to about 10% $B_2O_3$ by weight. In some implementations, the synthetic microparticle comprises about 0.1% to about 2% $Na_2O$ by weight. In some implementations, the synthetic microparticle comprises about 0.1% to about 5% $B_2O_3$ by weight.

In a further embodiment of the disclosure, there is provided a synthetic microparticle comprising about 30% to about 95% $SiO_2$, about 0% to about 45% $Al_2O_3$, about 0.1% to about 10% $B_2O_3$. In some implementations, the synthetic microparticle further comprises about 0% to about 30% one or more divalent metal oxides and about 0% to about 50% one or more monovalent metal oxides. In some implementations, the synthetic microparticle further comprises about 0% to about 30% one or more divalent metal oxides and about 0% to about 30% one or more monovalent metal oxides. In some implementations, the synthetic microparticle further comprises about 0% to about 20% other metal oxides. In some implementations, the synthetic microparticle comprises about 0% to about 5% one or more divalent metal oxides, and about 0% to about 5% one or more monovalent metal oxides. The divalent metal oxides can be selected from the group consisting of MgO, CaO, SrO, and BaO. The monovalent metal oxides can be selected from the group consisting of $Li_2O$, $Na_2O$, and $K_2O$. The other metal oxides may include multivalent metal oxides such as $Fe_2O_3$.

In a further embodiment of the disclosure, there is provided a synthetic microparticle consisting essentially of about 30% to about 95% $SiO_2$, about 0% to about 45% $Al_2O_3$, about 0.1% to about 10% $B_2O_3$, about 0% to about 30%, preferably about 0% to about 5%, one or more divalent metal oxides, and about 0% to about 30%, preferably about 0% to about 5%, one or more monovalent metal oxides, and about 0% to about 20% other metal oxides. The divalent metal oxides can be selected from the group consisting of MgO, CaO, SrO, and BaO. The monovalent metal oxides can be selected from the group consisting of $Li_2O$, $Na_2O$, and $K_2O$. The other metal oxides may include multivalent oxides such as $Fe_2O_3$.

In a further embodiment of the disclosure, the synthetic microparticle is formed as a synthetic microsphere, such as a synthetic hollow microsphere. In some implementations, the synthetic microsphere has an average particle diameter greater than about 30 microns. In a preferred implementation, the synthetic microsphere has an average particle diameter of between approximately 30 microns to 1000 microns.

In a further embodiment of the disclosure, the synthetic microparticle is formed as a shaped microparticle, for example, as a microbead, microwhisker, microfiber or microflake.

In a further embodiment of the disclosure, the synthetic microparticle, such as a microsphere, comprises at least one internal void. In a further embodiment of the disclosure, the synthetic microparticle, such as a microsphere, comprises at least one phase as a solid phase. In a further embodiment of the disclosure, the synthetic microparticle, such as a microsphere, comprises a multiphase solid phase wherein the solid phase comprises a least one amorphous solid phase and at least one crystalline solid phase.

In a further embodiment of the disclosure, the synthetic microparticle, such as a synthetic microsphere, comprises a multiphase solid phase having at least one amorphous solid phase, at least one crystalline solid phase and at least one fluid phase, wherein the fluid phase is preferably a gas phase.

In a further embodiment of the disclosure, there is provided a method of forming a synthetic microparticle comprising the steps of:

(a) combining the component materials together, wherein the component materials comprise a primary component and at least one binding agent;

(b) forming the component materials into a precursor comprising particles of a predetermined size and composition; and (c) firing the precursor particles at a predetermined temperature profile sufficient to combine the primary component and binding agent together to form a synthetic microparticle comprising a solid phase having at least about 60 atomic percent oxygen; about 19 atomic percent to about 25 atomic percent silicon; up to about 3 atomic percent monovalent cations; up to about 3 atomic percent divalent cations; at least about 10 atomic percent trivalent cations; and wherein the ratio of oxygen to silicon atoms is at least about 3.

In one embodiment of the disclosure, the precursor comprises an agglomerated precursor.

In a further embodiment of the disclosure, the precursor preferably has a total monovalent metal element content of up to about 3 atomic percent, and typically in the range of about 2.5 to 3 atomic percent. Without wishing to be bound by theory, it is believed that a total monovalent metal element content of up to about 3 atomic percent is advantageous because the microparticles formed from such a precursor has acceptably high chemical durability suitable for most applications while benefiting from fluxing activity during firing step (c) of the method of the disclosure.

In a further embodiment of the disclosure, the precursor has a total divalent metal element content of up to 3 atomic percent, and typically in the range of about 2.5 to 3 atomic percent. A total divalent metal element content of up to 3 atomic percent is advantageous; because the presence of divalent metal elements modify melt viscosity, but are not present at high enough a percentage to impact melting temperature or to cause devitrification during cooling.

An embodiment of the disclosure the primary component of the precursor, preferably an agglomerated precursor, comprising at least one aluminosilicate component.

In one embodiment, the primary component of the precursor comprises at least one aluminosilicate material, wherein the aluminosilicate material comprises about 40 weight percent (wt. %) or more, preferably about 50 wt. % or more, more preferably about 70 wt. % or more, more preferably about 80 wt. % or more, and more preferably about 90 wt. % or more when based on the total weight of the agglomerate precursor; alternatively the aluminosilicate material comprises about 80 wt. % or more, or about 90 wt. % or more when based on the total weight of the primary component of the precursor.

In one embodiment of the disclosure, the aluminosilicate material can be obtained from naturally occurring minerals, recycled waste materials or synthetic materials having a composition of greater than about 50 wt. %, preferably greater than about 60 wt. % of silica ($SiO_2$) and alumina ($Al_2O_3$) combined. It is to be understood that the amounts of silica and alumina will vary depending on the source and may even vary within the same source. Fly ash, for example, will contain varying amounts of silica and alumina depending on the type of coal used and combustion conditions. However, the skilled person will readily understand those materials are classed as "aluminosilicates".

Typically, aluminosilicate materials for use in the embodiments of the present disclosure have a composition of about 60 atomic percent or more of oxygen, about 19 to about 25 atomic percent silicon, up to about 3 atomic percent monovalent metal elements, up to about 3 atomic percent divalent metal elements, at least about 10 atomic percent trivalent elements. The atomic ratio of oxygen to silicon is greater than approximately 1:3 in the agglomerated precursor used in all embodiments of the present disclosure in order to ensure the silicon oxygen network within the structure of the synthetic microparticle of the disclosure is maintained at the single chain or ring structure level.

Methods disclosed in the present disclosure are not limited to any particular source of aluminosilicate material. However, in one embodiment of the disclosure the primary component comprises at least one aluminosilicate material selected from the group comprising Type F fly ash, bottom ash, blast-furnace slag, paper ash, aluminosilicate clays (e.g. kaolinite clay, bedalite clay, betonite clay, china, fire clays, etc.), obsidian, diatomaceous earth, volcanic ash, volcanic rocks, silica sand, silica fume, bauxite, volcanic glasses and combinations thereof. In at least one embodiment of the disclosure, the primary component comprises a class F fly ash.

In a further embodiment of the disclosure, the aluminosilicate material may be either calcined or non-calcined. Calcination can promote pre-reaction of oxide components and/or cause partial vitrification in the aluminosilicate material, which may be beneficial in the production of high quality synthetic microspheres.

Fly ash is a useful aluminosilicate primary component due to its low cost and availability. In one embodiment of the disclosure, the primary component comprises about 5 wt. % or more fly ash, and more preferably about 10 wt. % fly ash or more, based on the total amount of primary component. In another embodiment of the disclosure, the primary component comprises about 50 wt. % fly ash or more, more preferably about 70 wt. % fly ash or more, and more preferably about 90 wt. % fly ash or more, based on the total amount of primary component. In a further embodiment of the present disclosure, the primary component may be substantially all fly ash.

In further embodiments, at least one of the aluminosilicate material used comprises an amorphous phase and is either partially or wholly amorphous.

In a further embodiment of the disclosure, the primary component of the agglomerate precursor comprises a low alkali metal content material. The "low alkali material" refers to a material having a combined monovalent and divalent metal element content of up to about 8 atomic percent. Optionally, it is possible in further embodiments of the disclosure to include a secondary component comprising a relative high combined monovalent and divalent metal element materials. The relative high alkali secondary component may be combined with a low alkali primary component(s) so that the resulting agglomerated precursor still has sufficiently low overall alkali metal content.

In certain embodiments, the at least one primary component used preferably has an average primary particle diameter in the range of about 0.01 to less than about 1000 microns, more preferably about 0.01 to about 100 microns, more preferably about 0.05 to about 50 microns, more preferably about 0.1 to about 25 microns, and more preferably about 0.2 to about 10 microns. Preferred particle diameters may be achieved by appropriate grinding and classification techniques as known and understood by the person skilled in the art. All types of grinding, milling, and overall size reduction techniques that are used in ceramic industry can be used in embodiments of the present disclosure. Without limiting to other methods of size reduction used for brittle solids, preferred methods according to embodiments of the present disclosure are ball milling (wet and dry), high energy centrifugal milling, jet milling, and attrition milling. If more than one aluminosilicate material is to be used, then the multitude of ingredients can be co-ground together.

In an embodiment of the disclosure the primary component is combined with the at least one binding agent, such that the agglomerated precursor has an alkali metal content of at least about 3 atomic weight percent (wt. %) based on the weight of the precursor.

In a further embodiment of the disclosure the primary component is combined with the at least one binding agent to form an aqueous mix, for example, a slurry at step (a) of the method of the disclosure.

In a further embodiment of the disclosure the binding agent is selected from the group comprising of boric acid, alkali metal borate (e.g. sodium tetraborate), alkali metal silicates (e.g. sodium silicate), alkali metal aluminosilicate, alkali or alkaline earth metal carbonates, alkali or alkaline earth metal nitrates, alkali or alkaline earth metal nitrites, alkali or alkaline earth metal sulfates, alkali or alkaline earth metal phosphates, alkali or alkaline earth metal hydroxides (e.g. NaOH, KOH, or $Ca(OH)_2$), carbohydrates (e.g. sugar, starch, etc.), colloidal silica, inorganic silicate cements, Portland cement, alumina cement, lime-based cement, phosphate-based cement, organic polymers (e.g. polyacrylates) or combinations thereof. In an alternative embodiment, fly ash, such as ultrafine, Type C or Type F fly ash, can also act as a binding agent.

In further embodiments of the disclosure, the amount of binding agent is in the range of about 0.1 to about 30% by weight, more preferably about 0.1 to about 15% by weight, or more preferably about 0.1 to about 10% by weight based on the total weight of the precursor.

In a further embodiment of the disclosure, the binding agent has a melting point which is less than about 1200° Celsius (° C.), more preferably less than about 1100° C., and more preferably less than about 1000° C. In one embodiment of the disclosure the binding agent has a melting point between approximately 700° C. to approximately 1000° C.

In a further embodiment of the method of the disclosure, there is provided an agglomerate precursor comprising the at least one primary inorganic component and at least one binding agent, wherein the agglomerated precursor has an alkali metal element content of at least about 3 atomic weight percent based on the weight of the precursor.

In a further embodiment of the disclosure, the method further comprises at step (c), firing the precursor at a pre-determined temperature profile which is sufficient to combine the primary inorganic component and the binding agent so as to form one or more synthetic microparticles in the form of one or more microspheres having a substantially spherical wall and an average particle diameter greater than about 30 microns.

In a further embodiment of the disclosure, the synthetic microparticle is formed by heating each precursor particle to a temperature of at least about 500° Celsius during the firing step (step (c)) of the disclosure.

In a further embodiment of the disclosure, the method further comprises the step of providing a blowing agent capable of expanding during the firing step (step (c)) to form at least substantially enclosed void within the synthetic microparticle. Conveniently, the blowing agent is added at step (a) to the combination of component materials that is used to form the precursor. The blowing agent used in embodiments of the present disclosure is a substance which, when heated, liberates a blowing gas by one or more of combustion, evaporation, sublimation, thermal decomposition, gasification or diffusion.

In one embodiment of the disclosure the blowing gas may be, for example, $CO_2$, CO, $O_2$, $H_2O$, $N_2$, $N_2O$, NO, $NO_2$, $SO_2$, $SO_3$, or mixtures thereof. In a preferred embodiment of the disclosure the blowing gas comprises $CO_2$ and/or CO.

In a further embodiment of the disclosure, the blowing agent comprises one or more blowing agents selected from the group comprising powdered coal, carbon black, activated carbon, graphite, carbonaceous polymeric organics, oils, carbohydrates (e.g. sugar, starch, etc.), PVA (polyvinyl alcohol), carbonates, carbides (e.g. silicon carbide, aluminum carbide, and boron carbide, etc.), sulfates, sulfides, nitrides (e.g. silicon nitride, boron nitride, aluminum nitride, etc.), nitrates, amines, polyols, glycols, glycerine or combinations thereof. In the preferred embodiment of the disclosure, the blowing agent is selected from the group comprising carbon black, powdered coal, sugar and silicon carbide.

In a further embodiment of the disclosure, the binding agent and blowing agent are the same component material. An example of such a material is either sugar or starch. It is to be understood in this instance the component material is selected from a group of compounds wherein the same material exhibits the properties of both a blowing agent and a binding agent.

In one embodiment of the disclosure the amount of blowing agent comprises about 0.05 to about 10 wt. %, more preferably about 0.1 to about 6 wt. %, more preferably about 0.2 to about 4 wt. % based on the total weight of the agglomerate precursor. It is to be understood that the exact amount of blowing agent will depend on the composition of the primary component, the type of blowing agent and the required density of the final microsphere. The preferred ratio of primary component to blowing agent will vary, depending on the composition of each of the ingredients. In preferred embodiments of the disclosure, the ratio of primary component to blowing agent is in the range of about 1000:1 to 10:1, more preferably about 700:1 to 15:1, and more preferably about 500:1 to 20:1.

In one embodiment of the disclosure, the blowing agent is a non-water soluble blowing agent. In a further embodiment of the disclosure the non-water soluble blowing agent has an average particle diameter in the range of about 0.01 to 10 microns, more preferably about 0.5 to 8 microns, and more preferably about 1 to 5 microns.

In the preferred embodiment of the disclosure the resulting synthetic hollow microsphere formed by the steps of the method of the disclosure, has a bulk density of less than about 2 gm/cc, more preferably less than about 1.5 gm/cc and even more preferably less than about 1 gm/cc.

Optionally in this embodiment of the disclosure, the firing step (step (c)) further comprises firing the agglomerated precursor at a temperature range of between approximately 600 to approximately 2500° C., more preferably about 800 to about 2000° C., more preferably about 1000 to about 1500° C., and more preferably about 1100 to about 1400° C. In this way, a molten skin is formed around the precursor during the firing step so as to substantially trap the blowing agent inside the molten skin. In this embodiment of the disclosure, it is optional to activate the blowing agent during or after the formation of the molten skin. However, it will be appreciated that the requisite temperature profile will typically depend on the type of primary component and blowing agent used.

In a further embodiment of the disclosure the firing step (step (c)) further comprises firing the agglomerated precursor for a period of between approximately 0.05 to approximately 20 seconds and more preferably about 0.1 to about 10 seconds.

In a further embodiment of the disclosure the precursor composition may also comprise other processing aids or additives to improve mixing, flowability and other physical aspects of the precursor composition. Examples of such processing aids or additives include for example, surfactants, which assist in dispersion of the precursor components into an aqueous solution or paste. Optionally, the surfactants may be anionic, cationic or non-ionic surfactants. In a further embodiment of the disclosure, the processing aid or additive, comprises one or more of sulphonates, glycol ethers, hydrocarbons, sugar, cellulose ethers and the like. In a further embodiment of the disclosure the processing aids or additives are added to the combination of component materials in an amount ranging from about 0 to about 5 wt. % relative to the total weight of the component materials.

In a further embodiment of the present disclosure, the blowing agent and optionally the binding agent are added to the primary material, a primary inorganic component in some implementations, prior to step (a) to allow the components of the agglomerated precursor to be co-ground together (e.g. in a wet ball mill). An advantage of this is that it substantially eliminates aqueous mixing of the components together at step (a) of the disclosure.

In a further embodiment step (b) of the method of the disclosure, further comprises forming the component materials into a precursor comprising particles having an average agglomerate particle diameter in the range of about 10 to about 1000 microns, more preferably about 30 to about 1000 microns, more preferably about 40 to about 500 microns, and more preferably about 50 to about 300 microns.

In another embodiment of the disclosure, the method further comprises the step of drying the aluminosilicate component prior to the firing step. It is advantageous for the agglomerate precursor to be substantially dry, although a small amount of moisture may be present in the agglomerate precursor after a solution-based process for forming the precursor. Advantageously, the drying step is configured to remove moisture from the precursor so as to substantially reduce rupturing of the microspheres during the firing step. In one embodiment of the disclosure the precursor has a water content of about 10 wt. % or less, more preferably about 5 wt. % or less, and more preferably about 3 wt. % or less. In further embodiments, the precursor is dried at a temperature of approximately 50° C. to approximately 400° C. prior to the firing step.

In yet another embodiment of the disclosure, the method further comprises the step of rapidly cooling the mixture after the firing step.

Optionally the firing step can be performed in a variety of different equipment including fluidized bed reactor, a vortex furnace, a heated vertical pipe, a fuel fired furnace, or the like as known to the person skilled in the art.

In a further embodiment of the disclosure further comprises the step of providing an agglomerate precursor having a pre-determined amount of the at least one primary component and the at least one binding agent; and a pre-determined amount of at least one pre-selected chemical.

Optionally the at least one pre-selected chemical is combined with the primary component and the at least one binding agent to form a mixture at step (a). An advantage of this is that this method of manufacturing synthetic microspheres substantially reduces rupturing of the agglomerated precursor particles during the firing process.

In a further embodiment of the disclosure, the method further comprises the step of drying the mixture formed at step (a) to form the agglomerate precursor particles to a first moisture level and then firing the precursor at step (b) to react the at least one pre-selected chemical to form substantially spherical microspheres.

In yet another embodiment of the disclosure, a composite material comprises the disclosed synthetic microparticles. In a further embodiment, the composite material may be a fiber cement product.

In a further embodiment of the disclosure, a cementitious material comprises a cementitious matrix and a plurality of synthetic microparticles, wherein each synthetic microparticle comprises about 30% to about 95% $SiO_2$ by weight, about 2% to about 45% $Al_2O_3$ by weight, about 0% to about 4% $Na_2O$ by weight, and about 0.1% to about 10% $B_2O_3$ by weight.

BRIEF DESCRIPTION OF THE DRAWINGS

FIG. 1 shows a number of schematics of silicate structures across the possible range of oxygen to silicon ratios.

FIG. 1(i) shows a $Si_5O_{15}$ tetrahedron ring type structure showing 2 shared oxygen atoms per tetrahedron.

FIG. 1(j) shows a $Si_2O_7$ tetrahedron type structure showing 1 shared oxygen atom per tetrahedron.

FIG. 1(k) shows a $SiO_4$ tetrahedron type structure which is not sharing any oxygen atoms.

FIG. 1(l) shows a $SiO_3$ chain tetrahedron type structure which has 2 shared oxygen atoms per tetrahedron which is a non-terminating chain.

FIG. 1(m) shows a $Si_4O_{11}$ non-terminating double-chain tetrahedron type structure in which half the tetrahedra have 2 shared oxygen atoms and the other half of the tetrahedra have 3 shared oxygen atoms.

DETAILED DESCRIPTION

It will be appreciated that certain aspects of the disclosure provide a method of forming a synthetic microparticle as a hollow microsphere that is substantially chemically inert and dimensioned to be used as a substitute for natural harvested cenospheres. In particular, certain embodiments of the method are designed to form microspheres are configured with physical properties, such as particle size (diameter), aspect ratio and density that are substantially the same as the cenospheres. Embodiments of the disclosure describe microparticles suitable for use as a density modifying filler. However, it will be appreciated that the disclosure is not limited to this particular field of use. These and other objects and advantages of the preferred embodiments of the present disclosure will become more apparent from the following description.

As described hereinbelow, the embodiments of the present disclosure provide a chemically durable, synthetic microparticle. The embodiments also provide a method for manufacturing the synthetic microparticles as hollow microspheres, having properties and characteristics similar to natural cenospheres harvested from fly ash, including raw material composition and processing, and uses for the synthetic hollow microspheres in various applications, including fiber cement products.

DEFINITIONS

It is acknowledged that the term 'comprise' may, under varying jurisdictions be provided with either an exclusive or inclusive meaning. For the purpose of this specification, the term comprise shall have an inclusive meaning that it should be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

The term "primary component" is used to describe the component which comprises the major constituent of the precursor, whereby the amount of primary component exceeds the amount of any other individual constituent. The "primary component" can be, for example, an inorganic primary component.

As used herein, the term "synthetic hollow microsphere" or "synthetic microsphere" means a microsphere synthesized as a primary target product of a synthetic process. The term does not include harvested cenospheres which are merely a by-product of burning coal in coal-fired power stations.

Matrix Chemistry

The structure of any silica based material is a function of the degree of network formation by silica tetrahedra. The network formation is determined by the oxygen to silicon atomic ratio. Heat treated synthetic mixtures such as various glasses, glazes and ceramics have properties that are similarly controlled by the silicate network structure.

Figure 1A:
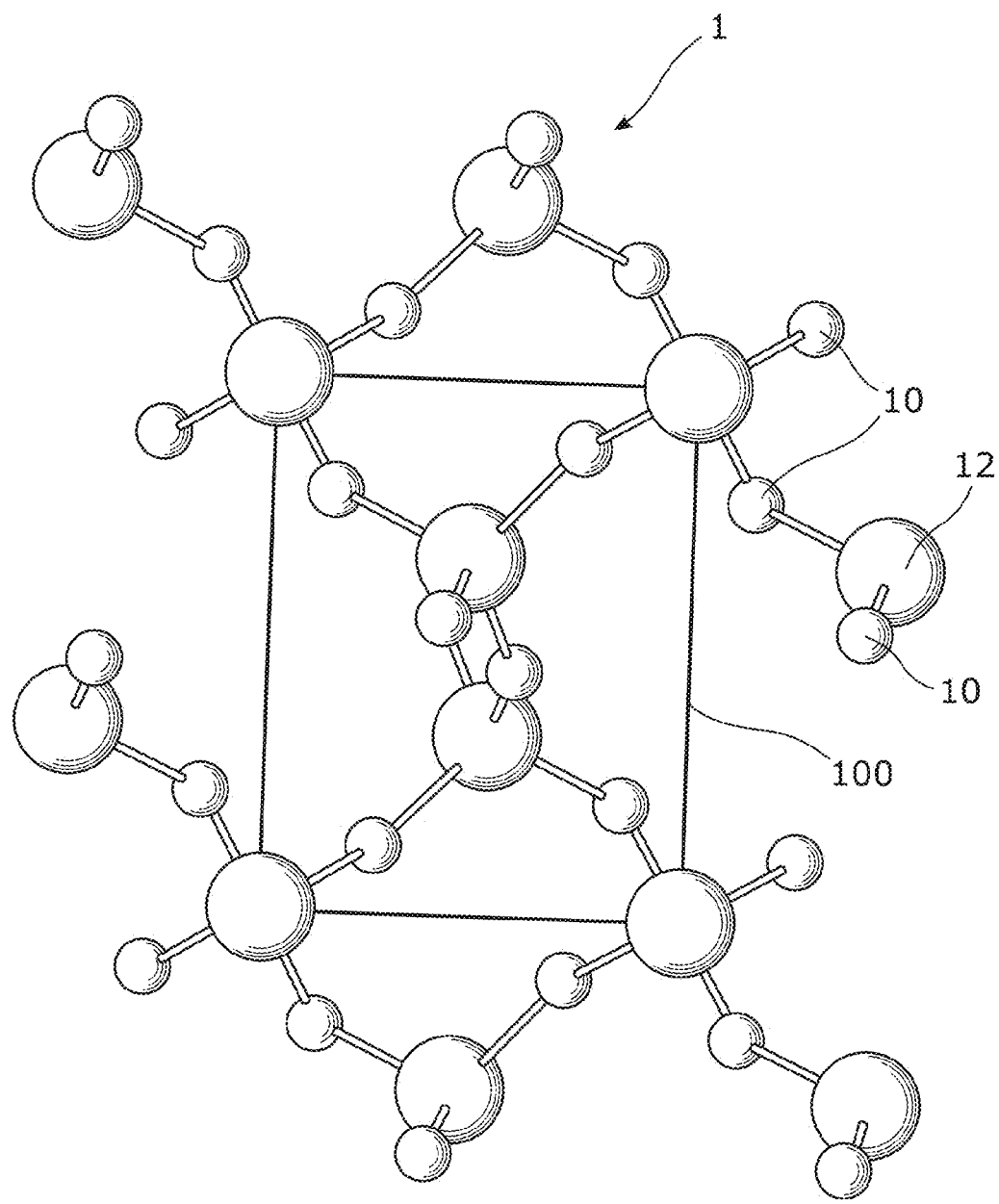
FIG. 1(a) shows a three dimensional network having an oxygen to silicon ratio of 2.
Figure 1B:
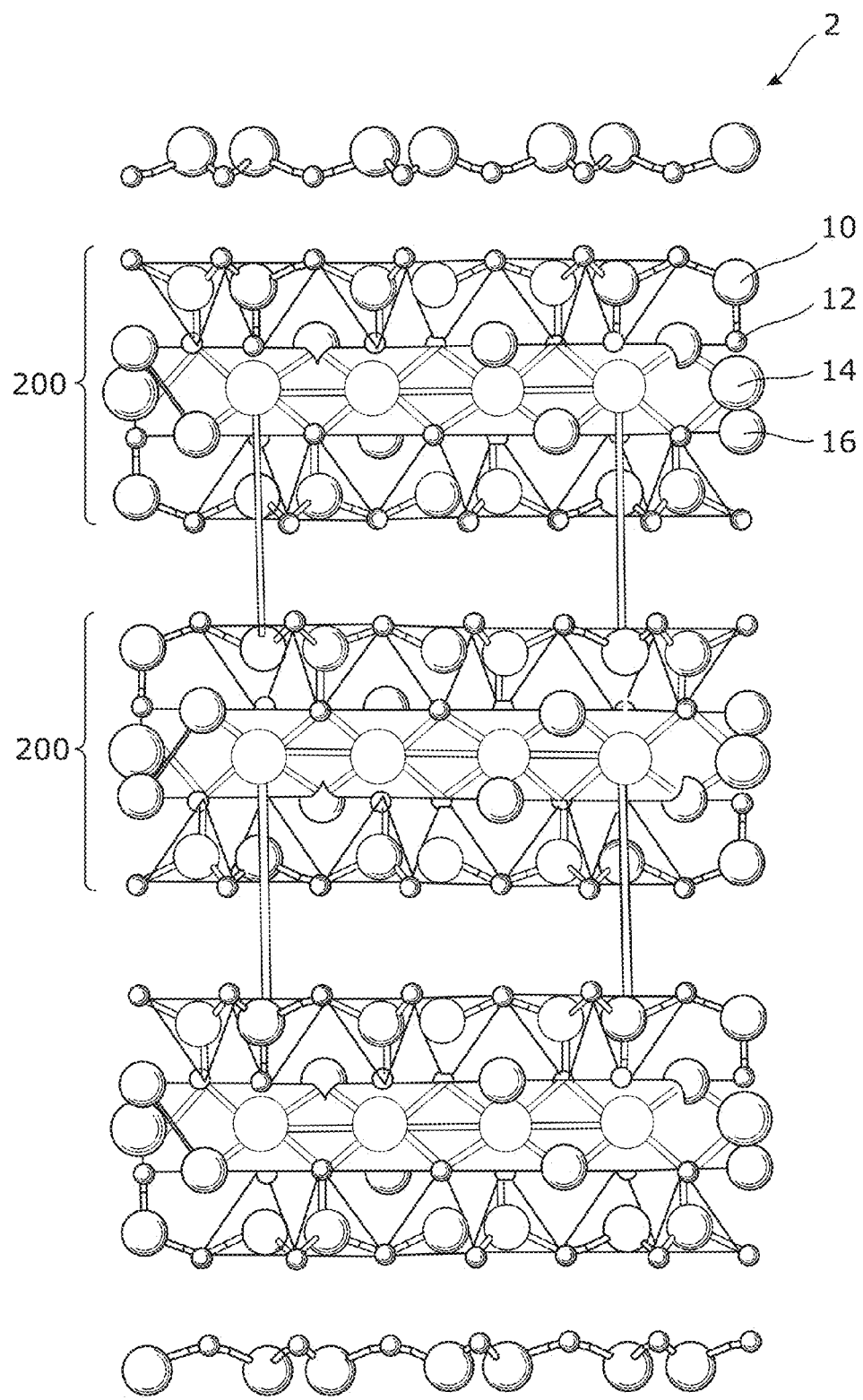
FIG. 1(b) shows a $Si_4O_{10}$ type sheet-like structure having an oxygen to silicon ratio of 2.5.
Figure 1C:
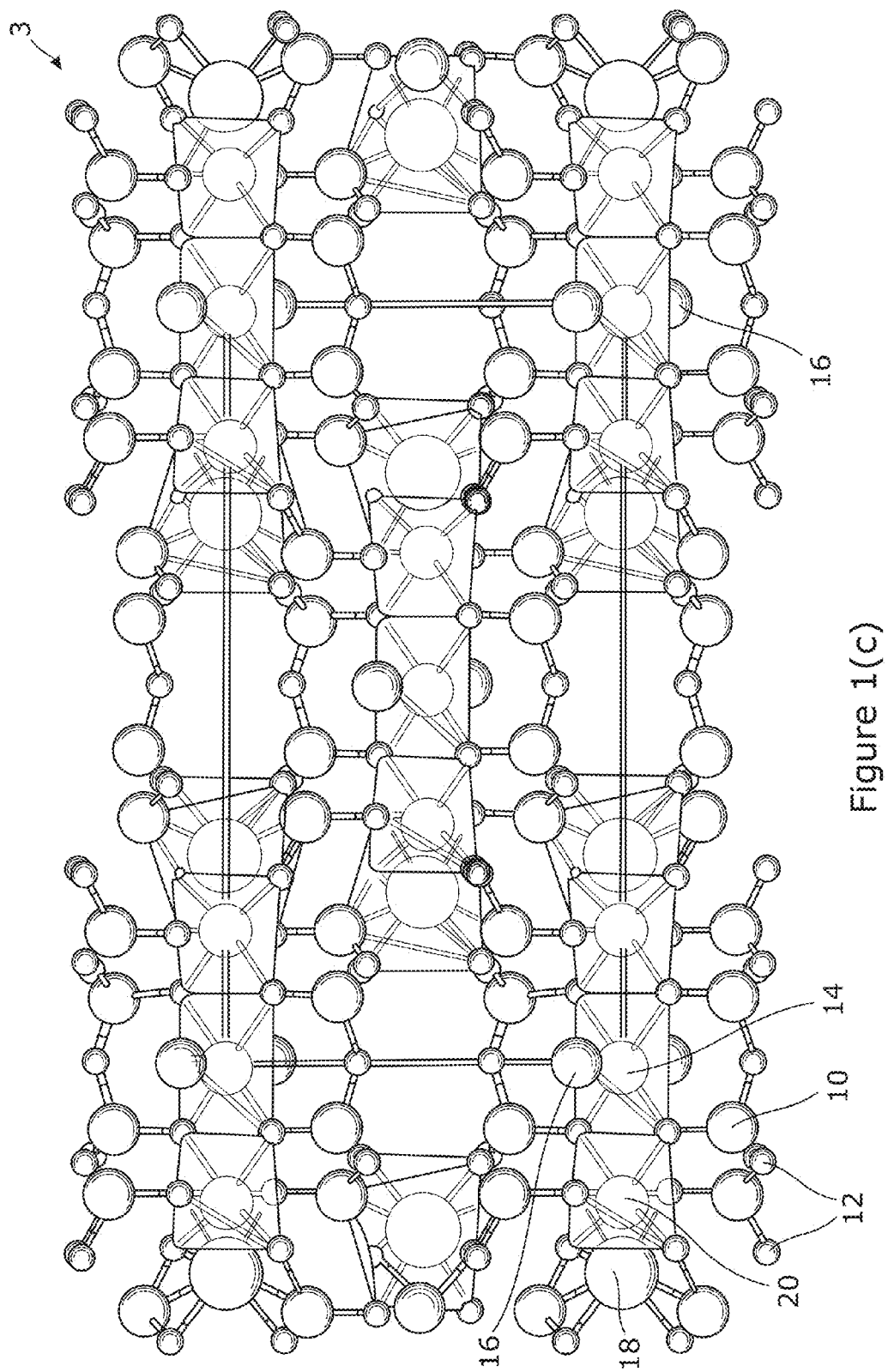
FIG. 1(c) shows a $Si_4O_{11}$ type chain structure having an oxygen to silicon ratio of 2.75.

FIG. 1(a) shows a diagram of a three dimensional network structure 1 comprising oxygen 10 and silicon 12 that occurs at an oxygen to silicon ratio of 2:1. An example of such a material is quartz. Quartz is well known for its hardness, strength, density and high melting temperature. Quartz or quartz "glass" melting temperature is over 1700 degrees Celsius. In this type of structure, each corner of the silicate tetrahedra 100 is shared with a neighbor to form the three-dimensional (3D) network.

Where the oxygen to silicon ratio is 2.5, the network structure is sheet like. An example of such a structure is an $Si_4O_{10}$ type phyllosilicate material 2, for example Talc, comprising oxygen 10, silicon 12, magnesium 14 and hydroxide ions 16 as shown in FIG. 1(b). In this configuration long range networks 200 are formed in only 2-dimensions. The separation of silicate sheet layers results in a material that lacks inter-laminar strength between the sheet layers 200 of the long range networks. FIG. 1(c) shows an example of a structure having an oxygen to silicon ratio of 2.75. In FIG. 1(c), the network structure 3 is a chain type $Si_4O_{11}$ amphibole structure comprising oxygen 10, silicon 12, magnesium 14, hydroxide ions 16, sodium 18 and aluminum 20.

Figure 1D:
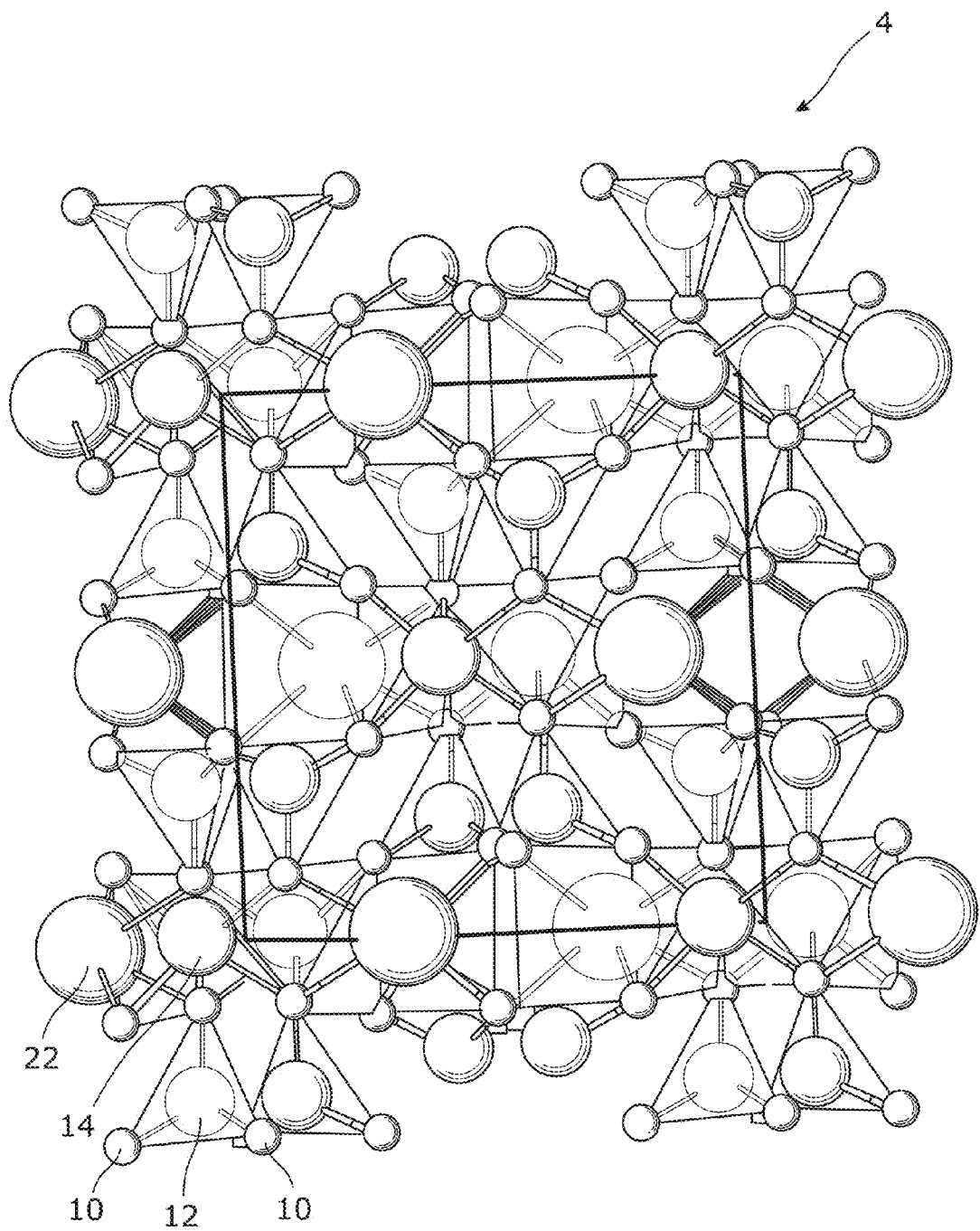
FIG. 1(d) shows a $SiO_3$ chain type pyroxene structure having an oxygen to silicon ratio of 3.
Figure 1E:
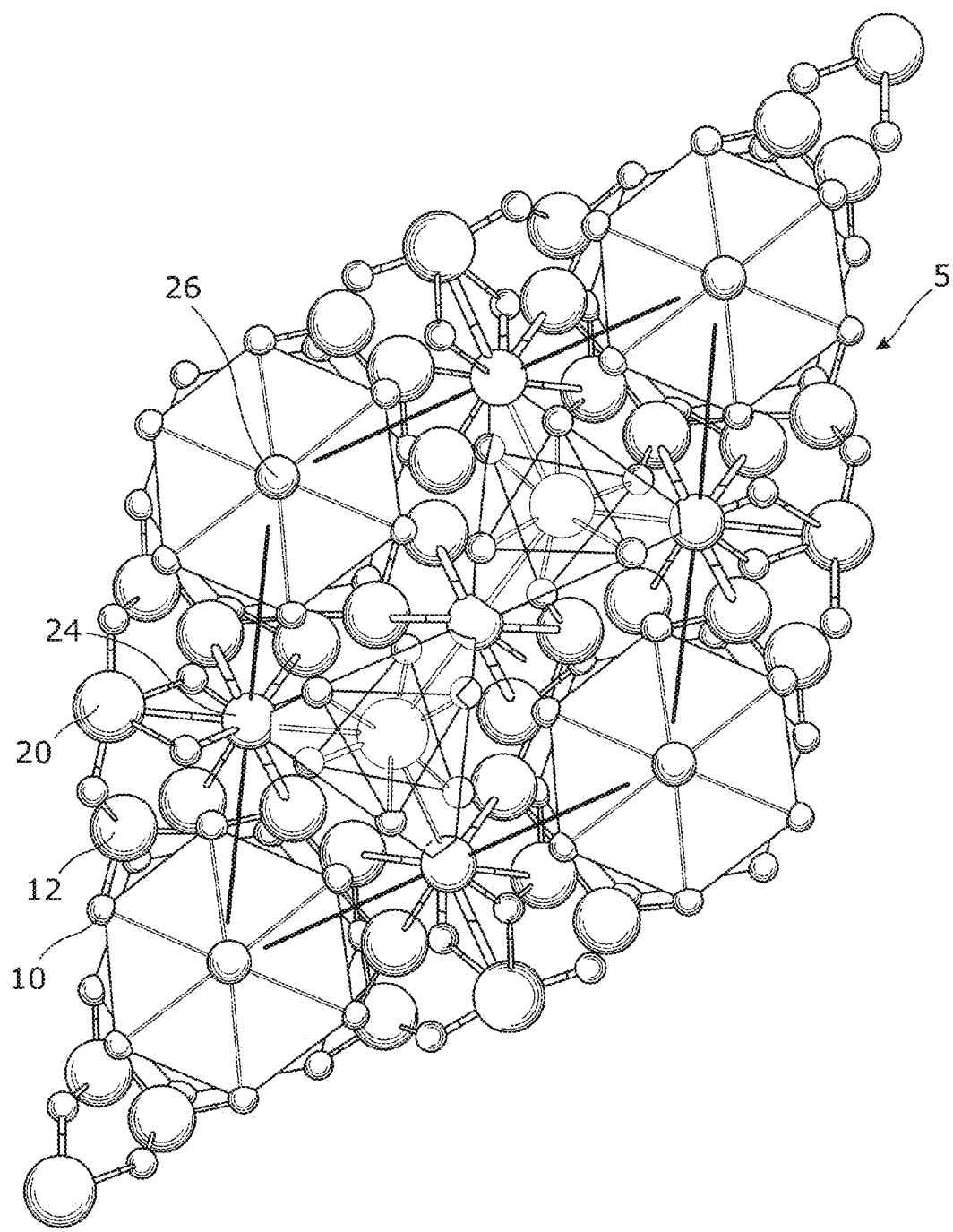
FIG. 1(e) shows a $SiO_3$ ring type beryl structure having an oxygen to silicon ratio of 3.

FIGS. 1(d) and 1(e), show network structures wherein the oxygen to silicon ratio is 3. FIG. 1(d) shows a $SiO_3$ pyroxene chain type structure 4 and FIG. 1(e) shows a beryl ring type structure 5. At this oxygen to silicon ratio, the structure of the silicate network is at its least dense, although the hardness is maintained. In the example of the pyroxene chain type structure 4 shown in FIG. 1(d), the structure comprises oxygen 10, silicon 12, magnesium, 14 and calcium 22. In contrast, the beryl ring type structure 5 shown in FIG. 1(e), comprises oxygen 10, silicon 12, aluminum 20, beryllium 24, water 26 and sodium (not visible in the structure).

Figure 1F:
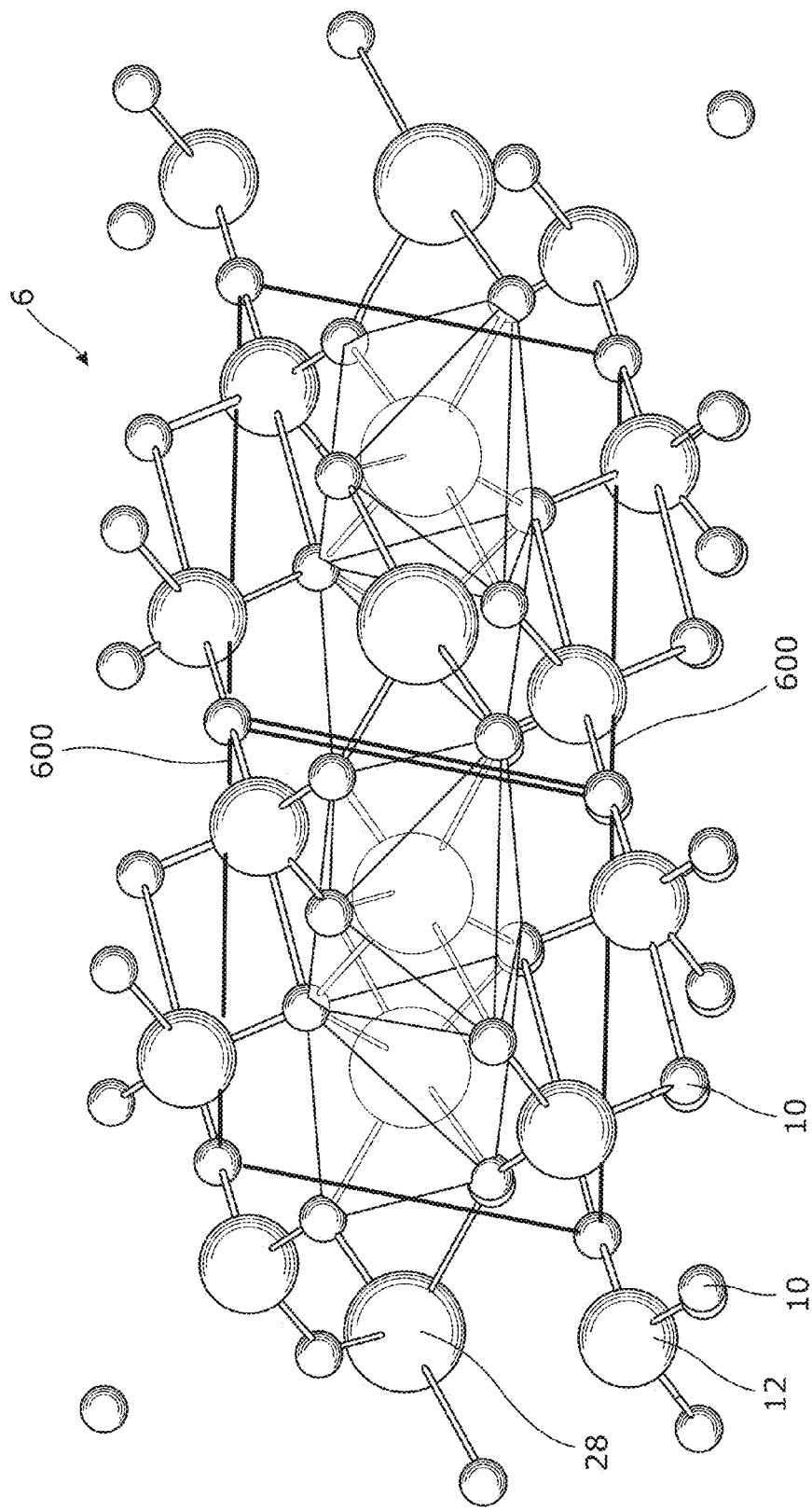
FIG. 1(f) shows a $Si_2O_7$ pyrosilicate type structure having an oxygen to silicon ratio of 3.5, the structure is of tetrahedra sharing one corner.
Figure 1G:
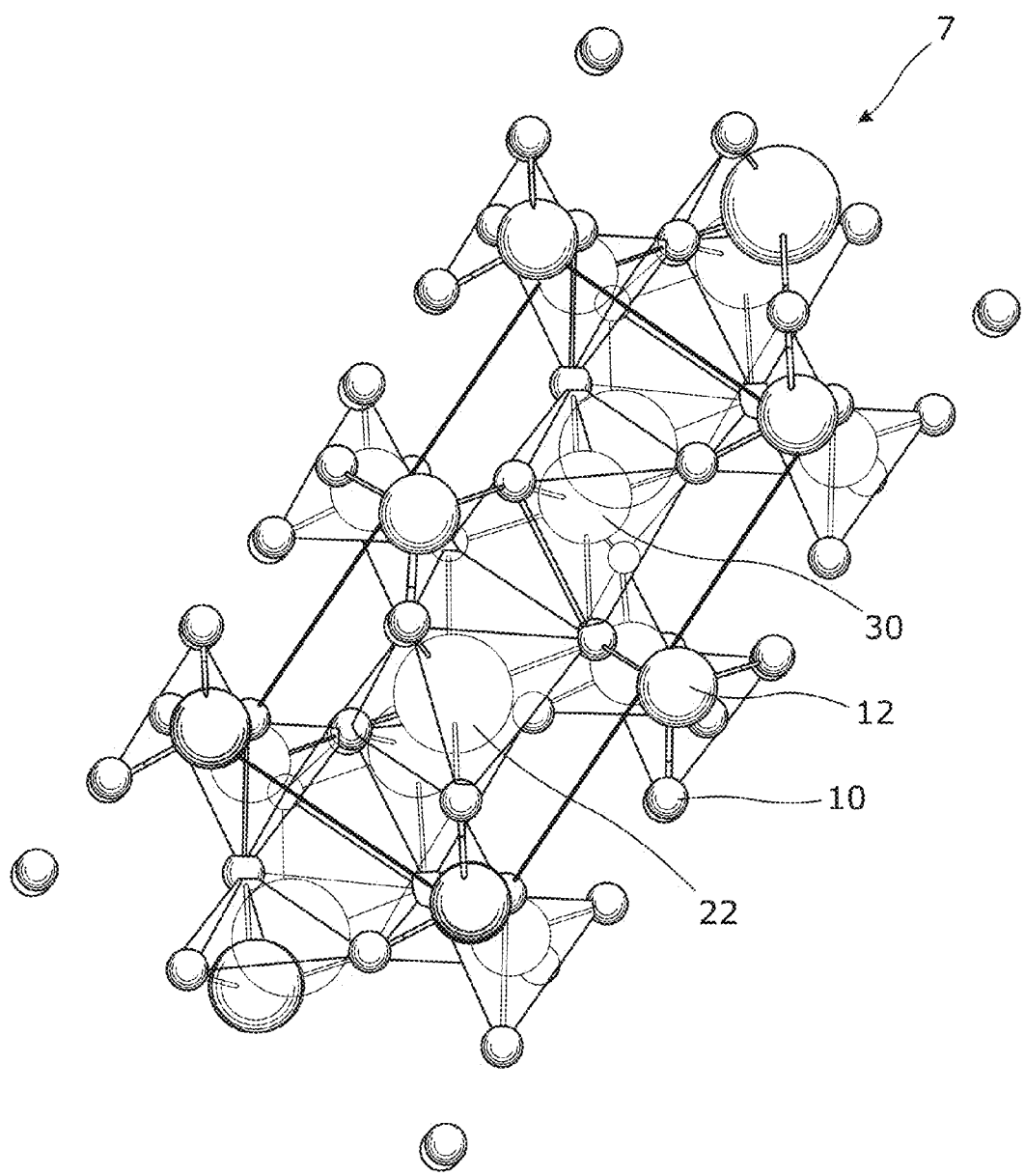
FIG. 1(g) shows a $SiO_4$ orthosilicate type structure having an oxygen to silicon ratio of 4, where only isolated tetrahedra are formed and no silicate networking occurs.
Figure 1H:
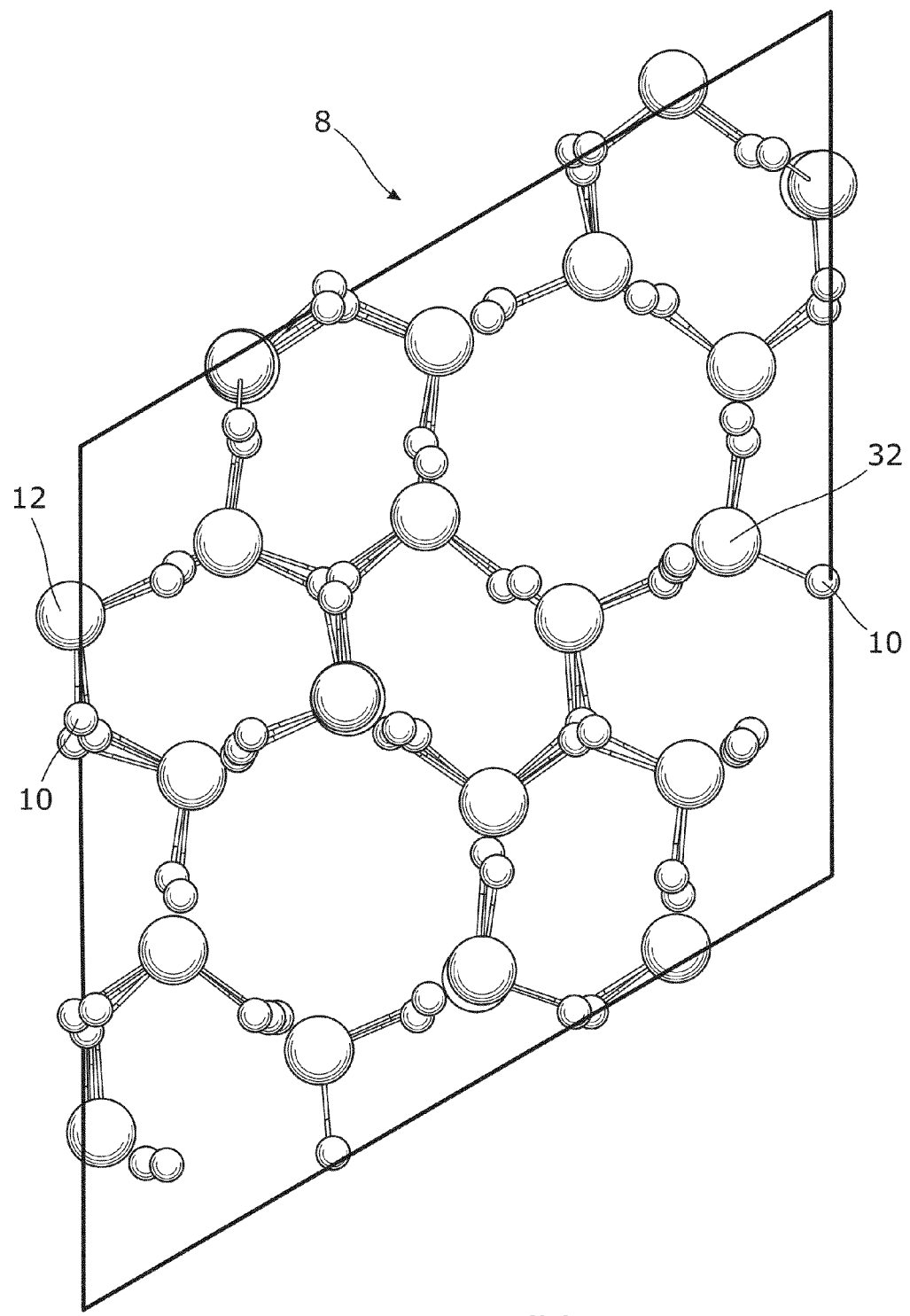
FIG. 1(h) shows a $SiO_4$ type structure having an oxygen to silicon ration of 4.
Figure 1N:
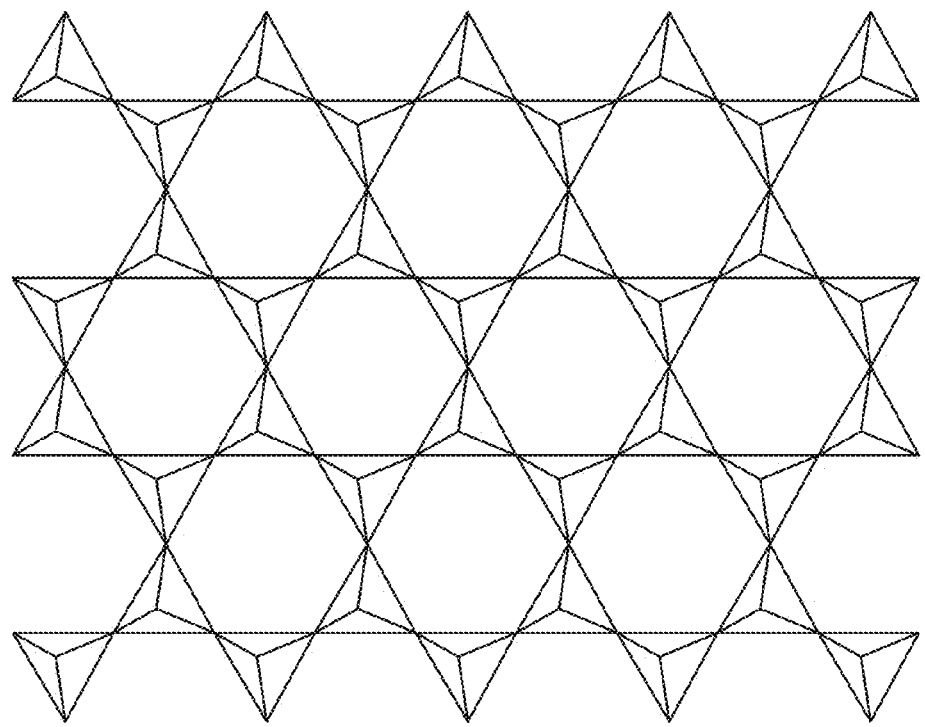
FIG. 1(n) shows a $Si_2O_5$ non-terminating sheet tetrahedron type structure in which the tetrahedra have 3 shared oxygen atoms.

Referring now to FIGS. 1(f) and 1(g) there are shown examples of silicate structures wherein the oxygen to silicon ratio is 3.5:1. Structure 6 of FIG. 1(f) comprises tetrahedra 600, wherein each tetrahedra 600 within the structure 6 share one corner. In the example shown, the structure 6 comprises the elements oxygen 10, silicon 12, and scandium 28 arranged in an $Si_2O_7$ type pyrosilicate structure. FIG. 1(g) is an example of the structure of Gittinsite comprising the elements oxygen 10, silicon 12, calcium 22 and zirconium 30. Referring now to FIG. 1(h) there is shown a structure 8, wherein the oxygen to silicon ratio is 4:1. Only isolated tetrahedra type orthosilicates are formed and no networking occurs. The properties of the material are largely influences by the cation species and concentration.

The effect on density and hardness of various network structure types in natural minerals can be seen in Table 1.

TABLE 1

| Name | O:Si | Density (gm/cc) | Hardness (Moh) |
| --- | --- | --- | --- |
| Quartz (3D) | 2 | 2.6 | 7 |
| Talc (sheet) | 2.5 | 2.75 | 1 |
| Glaucophane (double chain) | 2.75 | 3.1 | 6 |
| Diopside (single chain) | 3 | 3.4 | 6 |
| Beryl (Ring) | 3 | 2.76 | 7.5 |
| Gittinsite (corner shared tetrahedra) | 3.5 | 3.6 | 4 |
| Willemite (isolated tetrahedra) | 4 | 4.0 | 5.5 |

Figure 1O:
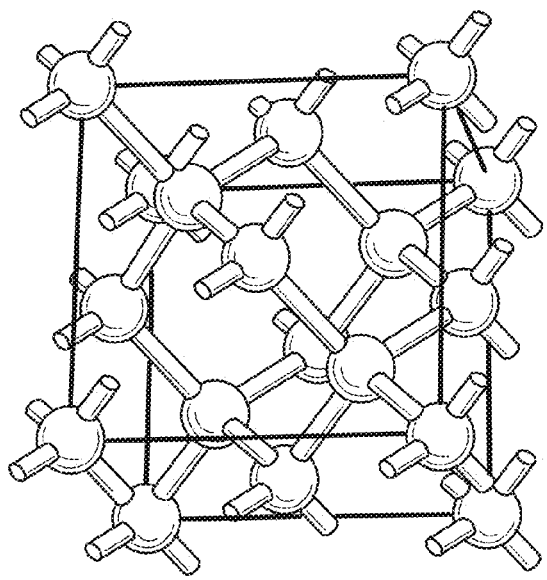
FIG. 1(o) shows a $SiO_2$ non-terminating tetrahedron type structure in which the tetrahedra have 4 shared oxygen atoms.

Charge balance in silicate networks is provided via the monovalent alkali metal elements, the divalent alkaline earth metal elements and transition metals elements, and the trivalent and other metal elements such as aluminum, boron, iron and yttrium. These elements can also contribute to modifying the structure of the materials by essentially providing, chain capping (monovalent), chain extending (divalent) or network modifying (trivalent) capabilities all of which are shown in FIGS. 1(i) to 1(o). FIGS. 1(i) to 1(o) illustrate some non-limiting examples of the structures of the above described elements. FIG. 1(i) illustrates a potentially repeating circular structure, as later shown in a linear progression in FIG. 1(m) and in a web connection in FIG. 1(n), that could extend or modify the chains in the structure. FIGS. 1(j) and 1(k) illustrate the individual units and connections of FIG. 1(i), and can be used either by themselves or in an extended structure. FIG. 1(l) illustrates an example of a repeating structure of FIGS. 1(j) and 1(k) in a linear chain in which other elements can potentially be attached to. FIG. 1(o) illustrates a three dimensional structure that can be formed. The atomic percent of these elements can also influence the network structure.

Manufacturers of synthetic silicate materials have long understood the benefits in reduction of melting point and melt viscosity of including a high percentage of alkali metal elements, usually incorporated in the form of oxides or carbonates. However, the higher the level of alkali metal elements, the less chemically durable a glass may be found to be.

In some cases that may not be an issue. The closer the oxygen:silicon ratio is in a glass structure, the stronger the structure will be (allowing for reduction in wall thickness of a container). However, the melting temperature is higher and therefore the higher the energy usage to form a container from a melt. Increasing the alkali metal content, reduces the hardness of the glass and the chemical durability, but also significantly reduces the energy requirement to form a melt and process that melt into containers.

Manufacturers of container glass maintain an oxygen to silicon ratio in their materials of approximately 2.3 to 2.4 providing them the benefits of strength and mouldability without the need for the structure or melt viscosity behavior of fiberglass melts. The relatively high atomic percent of alkali metal elements present are not necessarily a major issue for them, based on factors such as the intended contact time, relative surface area in contact with container contents, or the aggressiveness of the container contents towards the glass composition.

Manufacturers of specialty melt products, such as fiberglass fibers have long understood that tailoring their melt compositions to an oxygen to silicon ratio of approximately 2.75 to approximately 3 allows them to form chain like networks that are easy to draw into long, thin, flexible fibers.

A comparison of the atomic ratios of commonly available natural minerals and synthetic glasses is provided in Table 2, below.

Formation of microparticles provides a challenge in that the surface area to mass ratio is very high. Any issues regarding chemical durability, hardness, strength, melting temperature and the energy required to form a desired product are significantly different to any bulk melt formed articles. Surface tension and viscosity become major factors in being able to form synthetic microparticles economically and to desired properties. The high surface area to mass ratio also, for example, exacerbates any tendency for the composition to leach alkali from the surface. There is a driver to minimize chemically susceptible elements, such as alkali metal elements, available to leach from a synthetic microparticle.

The properties of melts able to form synthetic microparticles depends on maintaining a surface tension suitable for enabling the desired microparticle geometry and maintaining a melt viscosity sufficient to withstand any included secondary processes such as expansion that the microparticle may be subjected to during the forming process. Advantageously, maintaining an oxygen to silicon ratio of 3 or more while minimizing monovalent and divalent metal elements has been found to provide a solution for manufacture of synthetic microparticles that are less susceptible to chemical durability issues, that can be formed within the desired process parameters, and that are hard and as low a solid phase density as possible.

Synthetic Microparticles:

The synthetic microparticles, such as microspheres, as described herein generally comprises a substantially spherical outer wall and a substantially enclosed cavity or void defined by the wall, resembling the general configuration of harvested cenospheres. However, it will be appreciated that the synthetic microspheres of certain embodiments can be substantially solid. In certain embodiments, the synthetic microsphere also has one or more of the following characteristics, which are also generally characteristics of harvested cenospheres:

(i) an aspect ratio of between about 0.8:1 and about 1:1;
(ii) a void volume of between about 30% and about 95%, based on the total volume of the microsphere;

TABLE 2

| COMMERCIAL GLASS TYPES/ Minerals | O:Si | Atomic % O | Atomic % Si | Atomic % monovalent (alkali earth) | Atomic % divalent (inc. alkaline earth) | Atomic % trivalent (amphoteric) |
|---|---|---|---|---|---|---|
| Container glass | 2.38 | 60.62 | 25.43 | 9.21 | 3.9 | 0.84 |
| Borosilicate glass | 2.62 | 63.46 | 24.19 | 3.32 | 0.27 | 8.77 |
| e-glass | 3.28 | 61.91 | 18.9 | 0.4 | 8.67 | 9.97 |
| Fiber glass | 3.39 | 61.94 | 18.25 | 0.32 | 7.90 | 11.59 |
| Quartz | 2 | 66.67 | 33.33 | 0 | 0 | 0 |
| PQ Borosilicate microspheres | 2.67 | 59.2 | 22.2 | 13.1 | 0 | 5.5 |
| Fly Ash | 4.34 | 58.8 | 13.5 | 3.9 | 14.75 | 10.5 |
| Shirasu microballoons | 2.51 | 63.8 | 25.4 | 3.9 | 1.6 | 6.6 |
| Phyllosilicate (Talc) | 2.5 | 47.6 | 19.05 | 9.5 | 14.30 | 0 |
| Amphibole (Glaucophane) | 2.75 | 53.66 | 19.51 | 4.87 | 7.31 | 4.87 |
| Pyroxene (Diopside) | 3 | 60.0 | 20.0 | 0 | 20.0 | 0 |
| Beryl | 3 | 62.06 | 20.69 | 0 | 10.34 | 6.89 |
| Pyrosilicate (Gittinsite) | 3.5 | 63.63 | 18.18 | 0 | 18.18 | 0 |
| Zinc Silicate (Willemite) | 4 | 57.1 | 14.28 | 0 | 28.57 | 0 |

(iii) a wall thickness of between about 1 to about 100 microns and/or between about 5% and about 50% of the microsphere radius;

(iv) an average diameter of between about 30 to about 1000 microns; preferably about 40 and about 500 microns, more preferably between about 50 and about 300 microns;

(v) an outer wall thickness of between about 1 and about 50 microns, preferably between about 1 and about 30 microns, more preferably between about 2.5 and about 20 microns;

(vi) a particle density of between about 0.1 and about 2.0 g/cc, more preferably between about 0.2 and about 1.5 g/cc, and more preferably between about 0.4 and about 1 g/cc; or (vii) a bulk density of less than about 2.0 g/cc, preferably less than about 1.5 g/cc, more preferably less than about 1 gm/cc.

Figure 3:
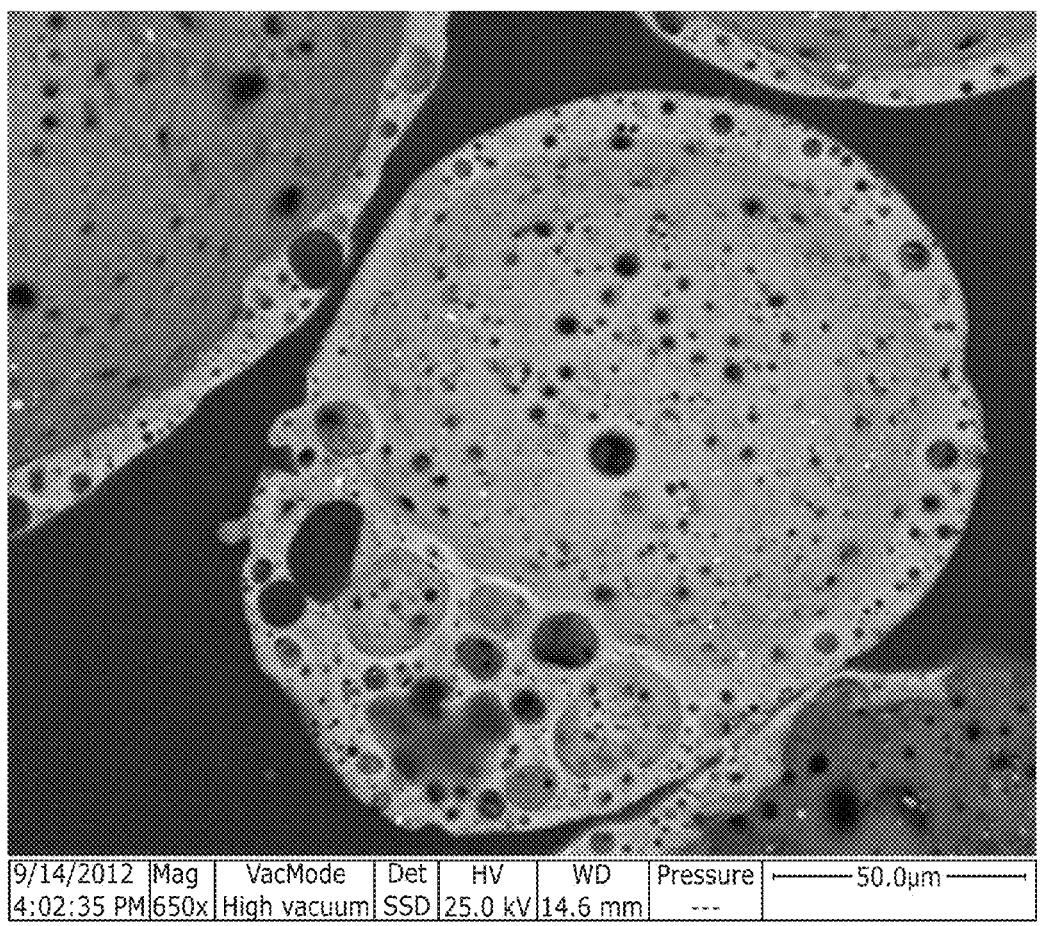
FIG. 3 is an SEM image of the synthetic microsphere of the disclosure.

In one embodiment, the synthetic microparticle comprises a composition comprising at least about 60 atomic % Oxygen, about 19 to about 25 atomic % Silicon, up to about 3 atomic % monovalent metal cations such as Na and K; up to about 3 atomic % divalent metal cations such as Mg, Ca, Sr, and Ba; and at least about 10 atomic % of trivalent metal cations such as Al, B, Fe and Y, and the oxygen to silicon ratio is at least 3. In this embodiment of the disclosure the synthetic microparticle is a hollow synthetic microsphere with an average particle diameter of between approximately 30 to 1000 microns as shown in FIG. 3.

In yet another embodiment, the synthetic microparticle comprises about 30% to about 95% $SiO_2$, about 0% to about 45% $Al_2O_3$, about 0.1% to about 10% $B_2O_3$, about 0% to about 30% by weight one or more divalent metal oxides, and about 0% to about 30% one or more monovalent metal oxides. In some implementations, the synthetic microparticle comprises about 0% to about 5% by weight one or more divalent metal oxides, and about 0% to about 5% by weight one or more monovalent metal oxides. In some implementations, the synthetic microparticle further comprises about 0 to about 20% by weight other metal oxides. In yet another embodiment, the synthetic microparticle comprises about 45% to about 75% $SiO_2$, about 10% to about 35% $Al_2O_3$, about 0.1% to about 10% $B_2O_3$, and optionally about 0.1% to about 10% divalent metal oxides and about 0.1% to about 10% monovalent metal oxides. In yet another embodiment, the synthetic microparticle comprises about 30% to about 90% by weight $SiO_2$, about 0% to about 45% by weight $Al_2O_3$, about 0.1% to about 10% by weight $B_2O_3$, about 0% to about 50% by weight one or more monovalent metal oxides, and about 0% to about 30% by weight one or more divalent metal oxides. In yet another embodiment, the synthetic microparticle comprises about 45% to about 75% by weight $SiO_2$, about 10% to about 35% by weight $Al_2O_3$, about 0.1% to about 10% by weight $B_2O_3$, about 0% to about 15% by weight one or more monovalent metal oxides, and about 0% to about 20% by weight one or more divalent metal oxides. The divalent metal oxides can be selected from the group consisting of MgO, CaO, SrO, and BaO. The monovalent metal oxides can be selected from the group consisting of $Li_2O$, $Na_2O$, and $K_2O$. The other metal oxides may be a multivalent metal oxide such as $Fe_2O_3$.

It is understood that the synthetic microsphere may contain more than one alkali metal element. Typically in prior art microspheres the alkali metal element comprises a combination of oxides of sodium and potassium. In the example described in detail below, the majority of the sodium oxide in the synthetic microspheres is derived from the binding agent used in the precursor for forming the synthetic microspheres. In one embodiment, the combined amount of monovalent alkali metal cations is up to 3 atomic percent.

In other embodiments, the synthetic microsphere further comprises one or more further component materials to form the microspheres. For example, the synthetic hollow microsphere may also comprise residual amounts of a blowing agent used to form the microsphere as will also be described in greater detail below.

The synthetic hollow microspheres of the preferred embodiments have several advantages over microspheres known in the prior art. Firstly, the synthetic microspheres comprise aluminosilicate material. Aluminosilicates are inexpensive and widely available throughout the world, for example from a large variety of rocks, clays and minerals and also from waste by-products, particularly bottom ash and fly ash. It is particularly advantageous that the synthetic microspheres can be prepared from fly ash. Secondly, the presence of low quantities of alkali metal oxide provides the microspheres with acceptably high chemical durability and can be used in the same situations as known cenospheres.

As will be described in greater detail below, the synthetic hollow microsphere of one embodiment is formed by first preparing an agglomerate precursor, wherein the agglomerate precursor comprises a primary component, a binding agent, and a blowing agent. The agglomerate precursor is then fired at a predetermined temperature profile sufficient to seal the surface of the precursor and activate the blowing agent thereby forming a synthetic hollow microsphere.

Agglomerate Precursor

In this example of the disclosure, the agglomerate precursor is generally a substantially solid agglomerate mixture comprising a primary component, a binding agent and a blowing agent. Preferably, the amount of primary component comprises about 40 wt. % or more based on the total weight of the agglomerate precursor, more preferably about 50 wt. % or more, more preferably about 70 wt. % or more, more preferably about 80 wt. % or more, and more preferably about 90 wt. % or more.

Preferably, the amount of blowing agent comprises about 0.05 to about 10 wt. %, based on the total weight of the agglomerate precursor, more preferably about 0.1 to about 6 wt. %, more preferably about 0.2 to about 4 wt. %. The exact amount of blowing agent will depend on the composition of the primary component, the type of blowing agent and the desired density of the final microsphere. The preferred ratio of primary component to blowing agent will vary, depending on the composition of each of the ingredients. Typically, the ratio of primary component to blowing agent is in the range of about 1000:1 to 10:1, more preferably about 700:1 to 15:1, and more preferably about 500:1 to 20:1.

Preferably, the agglomerate precursor has a water content of about 10 wt. or less, more preferably about 5 wt. % or less, and more preferably about 3 wt. % or less. The agglomerate precursor is substantially dry, although a small amount of moisture may be present in the agglomerate precursor after a solution-based process for forming the precursor, which is to be described in greater detail below. A small amount of water may also help to bind particles in the agglomerate together, especially in cases where particles in the agglomerate precursor are water-reactive. In some embodiments, when the agglomerate precursor has greater than about 10 wt. % water, such as for example about 14 wt. %, it was found that the agglomerate tend to burst into fines during the firing process.

Moreover, the agglomerate precursor preferably has a total monovalent metal element content of up to about 3 atomic %, and typically in the range of about 2.5 to about 3 atomic %. A total monovalent metal element content of up to about 3 atomic % is advantageous, because microparticles formed from such agglomerate precursors will still have acceptably high chemical durability suitable for most applications, but still benefit from some fluxing activity during melting.

Similarly, the agglomerate precursor has a total divalent metal element content of up to about 3 atomic percent, and typically in the range of about 2.5 to about 3 atomic percent. A total divalent metal element content of up to about 3 atomic percent is advantageous, because the presence of divalent metal elements can act modify melt viscosity, but are not present at high enough a percentage to impact melting temperature or to cause devitrification during cooling.

Trivalent elements such as Aluminum, Boron and Yttrium are present at a total content of at least about 10 atomic percent. The presence of aluminum, added to the precursor composition as either part of an inherent fly ash composition, or as a clay or other aluminosilicate mineral or recycled waste material, provides a network modifying behavior during melting. The presence of aluminum disrupts the silicate network but, on its own, is prone to forming high temperature aluminosilicate minerals such as mullite during firing. This can be seen as a form of devitrification and is not an intended outcome. By adding a second trivalent element such as Boron into the precursor composition, an advantageous outcome in providing additional fluxing behavior, suppressing crystallization of high temperature phases and modifying the melt viscosity are achieved.

Preferably, the agglomerate is particulate, having an average agglomerate particle diameter in the range of about 10 to about 1000 microns, more preferably about 30 to about 1000 microns, more preferably about 40 to about 500 microns, and more preferably about 50 to about 300 microns.

Precursor Component Materials

In each preferred embodiment, the primary component of the agglomerate precursor comprises a low alkali metal content material. The "low alkali material" refers to a material having a combined monovalent and divalent metal element content of up to about 8 atomic percent. However, in some embodiments, relative high combined monovalent and divalent metal element materials may still be included as a secondary component. The relative high alkali secondary component may be combined with low alkali primary component(s) so that the resulting agglomerated precursor still has a low overall alkali metal content.

Accordingly, waste glass powders, such as soda lime glasses (sometimes referred to as cullet) having a combined monovalent and divalent metal element content of up to about 15 atomic percent may be included as a secondary component. However, when combined with other low alkali primary component(s), the overall combined monovalent and divalent metal element concentration of the agglomerated precursor should be about 8 atomic or less.

Hitherto, it was believed that relatively large amounts of alkali metal oxides were required to act as a fluxing agent in forming glass microspheres from alkali metal silicates. However, the disclosure shows a method to form synthetic micropaticles from commonly available sources of raw materials substantially free of monovalent and divalent metal elements. This will be described in greater detail below.

The primary component of the agglomerated precursor is an aluminosilicate material. Aluminosilicate materials in the form of naturally occurring minerals, recycled waste materials or synthetic materials are well known to the person skilled in the art. Generally, these are materials having a composition of greater than about 50 wt. %, preferably greater than about 60 wt. % of silica ($SiO_2$) and alumina ($Al_2O_3$) combined. The amounts of silica and alumina will vary depending on the source and may even vary within the same source. Fly ash, for example, will contain varying amounts of silica and alumina depending on the type of coal used and combustion conditions. However, the skilled person will readily understand those materials classed as "aluminosilicates".

In one embodiment, the primary component of the precursor comprises at least one aluminosilicate material, preferably about 80 wt. % or more, or about 90 wt. % or more, based on the weight of the primary component. Typically, aluminosilicate materials for use in the embodiments of the present disclosure have a composition of about 60 atomic percent or more of oxygen, about 19 to about 25 atomic percent silicon, up to about 3 atomic percent monovalent metal elements, up to about 3 atomic percent divalent metal elements, at least about 10 atomic percent trivalent elements. The atomic ratio of oxygen to silicon is greater than about 3 in the agglomerated precursor used in all embodiments of the present disclosure in order to ensure the silicon oxygen network structure is maintained at the single chain or ring structure level.

Methods of the present embodiments are not limited to any particular source of aluminosilicate material. However, the primary component preferably comprises at least one aluminosilicate material selected from Type F fly ash, bottom ash, blast-furnace slag, paper ash, aluminosilicate clays (e.g. kaolinite clay, bedalite clay, betonite clay, china, fire clays, etc.), obsidian, diatomaceous earth, volcanic ash, volcanic rocks, silica sand, silica fume, bauxite, volcanic glasses and combinations thereof. More preferably, the primary component comprises a class F fly ash.

The aluminosilicate material may be either calcined or non-calcined. The term "calcined" means that the aluminosilicate material has been heated in air to a predetermined calcination temperature for a predetermined duration so as to either oxidize or pre-react certain component(s) of the aluminosilicate material. Calcination of the aluminosilicate material may be advantageous in certain embodiments of the present disclosure since the blowing (expansion) process of the microspheres can be sensitive to the redox state of multivalent oxide(s) present in the aluminosilicate material. Without wishing to be bound by theory, it is believed that activation of the blowing agent is influenced by the release of oxygen from the multivalent oxide(s) present in the aluminosilicate material (e.g., by redox reaction). As an example, a carbonaceous blowing agent may be oxidized to $CO_2$ by ferric oxide ($Fe_2O_3$), which is in turn reduced to ferrous oxide (FeO). The release of $CO_2$ from the blowing agent expands the microspheres. Hence, by pre-calcining the aluminosilicate material in air, the relative amount of ferric oxide is increased, which is then used as a source of oxygen for blowing agents to produce more gas, thereby lowering the density of the microspheres.

In addition, calcination can promote pre-reaction of oxide components and/or cause partial vitrification in the aluminosilicate material, which may be beneficial in the production of high quality synthetic microspheres.

Fly ash is a particularly preferred aluminosilicate primary component due to its low cost and availability. In one preferred form of the disclosure, the primary component comprises about 5 wt. % or more fly ash, and more preferably about 10 wt. % fly ash or more, based on the total amount of primary component. In another preferred form, the primary component comprises about 50 wt. % fly ash or more, more preferably about 70 wt. % fly ash or more, and more preferably about 90 wt. % fly ash or more, based on the total amount of primary component. In some embodiments of the present disclosure, the primary component may be substantially all fly ash.

In certain embodiments, at least one of the aluminosilicate material used preferably comprises an amorphous phase and is either partially or wholly amorphous.

In certain embodiments of the disclosure, at least one of the aluminosilicate material used preferably has an average primary particle diameter in the range of about 0.01 to about 100 microns, more preferably about 0.05 to about 50 microns, more preferably about 0.1 to about 25 microns, and more preferably about 0.2 to about 10 microns. Preferred particle diameters may be achieved by appropriate grinding and classification. All types of grinding, milling, and overall size reduction techniques that are used in ceramic industry can be used in embodiments of the present disclosure. Without limiting to other methods of size reduction used for brittle solids, preferred methods according to embodiments of the present disclosure are ball milling (wet and dry), high energy centrifugal milling, jet milling, and attrition milling. If more than one aluminosilicate material is to be used, then the multitude of ingredients can be co-ground together. In one method of the present disclosure, the blowing agent and, optionally the binding agent as will be described in greater detail below, are added to the aluminosilicate material before the milling process. For example all the ingredients can be co-ground together (e.g. in a wet ball mill), which then substantially eliminates the aqueous mixing.

Binding Agent

In the preferred embodiment of the disclosure, the agglomerate precursor comprises a binding agent (or binder). The primary function of the binding agent is to bind the particles in the agglomerate together. In some embodiments, the binding agent may act initially to bind particles of the agglomerate together during formation of the agglomerate precursor, and then act as a blowing agent during subsequent firing process.

In the preferred embodiment of the disclosure, the binding agent predominantly comprises boric acid, or an alkali metal borate (e.g. sodium tetraborate), but may also comprise a mixture including additional components selected from alkali metal silicates (e.g. sodium silicate), alkali metal aluminosilicate, alkali or alkaline earth metal carbonates, alkali or alkaline earth metal nitrates, alkali or alkaline earth metal nitrites, alkali or alkaline earth metal sulfates, alkali or alkaline earth metal phosphates, alkali or alkaline earth metal hydroxides (e.g. NaOH, KOH, or Ca(OH)$_2$), carbohydrates (e.g. sugar, starch, etc.), colloidal silica, inorganic silicate cements, Portland cement, alumina cement, lime-based cement, phosphate-based cement, organic polymers (e.g. polyacrylates) or combinations thereof. In an alternative embodiment, fly ash, such as ultrafine, Type C or Type F fly ash, can also act as a binding agent.

Blowing Agent

The blowing agent used in embodiments of the present disclosure is a substance which, when heated, liberates a blowing gas by one or more of combustion, evaporation, sublimation, thermal decomposition, gasification or diffusion. The blowing gas may be, for example, $CO_2$, $CO$, $O_2$, $H_2O$, $N_2$, $N_2O$, $NO$, $NO_2$, $SO_2$, $SO_3$, or mixtures thereof. Preferably, the blowing gas comprises $CO_2$ and/or $CO$.

Preferably, the blowing agent is selected from powdered coal, carbon black, activated carbon, graphite, carbonaceous polymeric organics, oils, carbohydrates (e.g. sugar, starch, etc.) PVA (polyvinyl alcohol), carbonates, carbides (e.g. silicon carbide, aluminum carbide, and boron carbide, etc.), sulfates, sulfides, nitrides (e.g. silicon nitride, boron nitride, aluminum nitride, etc.), nitrates, amines, polyols, glycols, glycerine or combinations thereof. Carbon black, powdered coal, sugar and silicon carbide are particularly preferred blowing agents.

Preferably, and particularly if the blowing agent is non-water soluble, the blowing agent has an average particle diameter in the range of about 0.01 to about 10 microns, more preferably about 0.5 to about 8 microns, and more preferably about 1 to about 5 microns.

The binding agent and blowing agent are typically different from each other, although in some cases (e.g. sugar, starch, etc.) the same substance may have dual blowing/binding agent properties.

In certain preferred embodiments, the amount of binding agent is in the range of about 0.1 to about 50 wt. % based on the total weight of the agglomerate precursor, more preferably about 0.5 to about 40 wt. % and more preferably about 1 to about 30 wt. %.

It has been unexpectedly found that the properties of the binder or binding agent, and in particular its melting point, affect the properties of the resulting microspheres. Without wishing to be bound by theory, it is understood by the present inventors that the binder is responsible for forming a molten skin around the agglomerate precursor during or prior to activation of the blowing agent in the firing step as will be described in greater detail below. Hence, in a preferred form of the present disclosure, the binding agent has a melting point which is lower than the melting point of the whole agglomerate precursor. Preferably, the binding agent has a melting point which is less than about 1200° C., more preferably less than about 1100° C., and more preferably less than about 1000° C.

It has also been unexpectedly found that the degree of crystallinity in the binder phase can have a pronounced effect on the formation kinetics of the molten skin.

In standard glass technology, sodium oxide is known to be a strong fluxing agent. Its addition to silicate glass lowers the melting point and viscosity of the glass. For example, in a typical soda lime glass composition, there is about 15 wt. % sodium oxide, which lowers the melting temperature of $SiO_2$ from about 1700° C. to less than about 1400° C. Both monovalent metal oxides, such a sodium oxide, potassium oxide and lithium oxide, as well as divalent metal oxides, such as calcium oxide, barium oxide and zinc oxide, act as fluxing agents in glass making technology. Oxides of monovalent and divalent metals change the ratio of oxygen to silicon in the mix and break up the 3-D network of pure silica. Controlling the type and amount of fluxing agent controls not only the melting point but also the structure of the glass formed. Controlling the structure also controls the melt flow characteristics during firing. Using borax as a flux introduces an unusual trivalent fluxing agent as well as the monovalent metal oxide, sodium oxide. The combination provides a double combination of fluxing agents.

Traditionally, it was believed that a relatively high amount (e.g. greater than 15 atomic %) of sodium oxide was necessary in glass-making technology to act as a fluxing agent. However, in certain embodiments of the present disclosure, it was surprisingly found that relatively high amounts of sodium oxide are actually less preferred.

The agglomerate precursor composition may also include minor additives such as surfactants, which assist in dispersion of the agglomerate precursor components into an aqueous solution or paste. The surfactants may be anionic, cationic or non-ionic surfactants.

As described the above, once the agglomerate precursor is formed, it is fired at a predetermined temperature profile sufficient to seal the surface of the precursor and activate the blowing agent.

Methods of Forming the Synthetic Microspheres.

As described above, the synthetic microspheres of certain preferred embodiments can be formed by first combining the primary component with a binding agent and a blowing agent so as to form an agglomerate precursor in a manner to be described in greater detail below. For the formation of substantially solid microspheres, the blowing agent can be left out. The agglomerate precursor is then fired at a pre-determined temperature profile sufficient to activate the blowing agent to release a blowing gas, thereby forming a microsphere with at least one substantially enclosed void. In embodiments for forming solid synthetic microspheres, the agglomerate precursor is fired at a pre-determined temperature profile that will adequately combine the primary component with the binding agent.

In certain preferred embodiments, the temperature profile used in the firing step substantially fuses the precursor into a melt, reduces the viscosity of the melt, seals the surface of the precursor and promotes expansive formation of gas within the melt to form bubbles. The temperature profile preferably should maintain the melt at a temperature and time sufficient to allow gas bubbles to coalesce and form a primary void. After foaming or formation of the primary void, the newly expanded particles are rapidly cooled, thus forming hollow glassy microspheres. In one embodiment, the temperature profile is preferably provided by a furnace having one or more temperature zones, such as a drop tube furnace, a vortex type furnace, a fluidized bed furnace or a fuel fired furnace, with upward or downward draft air streams. A fuel fired furnace used in certain preferred embodiments of the present disclosure includes furnace types in which agglomerated precursors are introduced directly into one or a multitude of combustion zones, to cause expansion or blowing of the particles. This is a preferred type of furnace, since the particles benefit by direct rapid heating to high temperatures, which is desirable. The heat source may be electric or provided by burning fossil fuels, such as natural gas or fuel oil. One preferred method of heating is by combustion of natural gas, since this is more economical than electric heating and cleaner than burning fuel oil.

Typically, the peak firing temperature in the firing step is in the range of about 600 to about 2500° C., more preferably about 800 to about 2000° C., more preferably about 1000 to about 1500° C., and more preferably about 1100 to about 1400° C. However, it will be appreciated that the requisite temperature profile will typically depend on the type of aluminosilicate primary component and blowing agent used. Preferably, the exposure time to the peak firing temperatures described above will be for a period of about 0.05 to about 20 seconds, more preferably about 0.1 to about 10 seconds.

Figure 2:
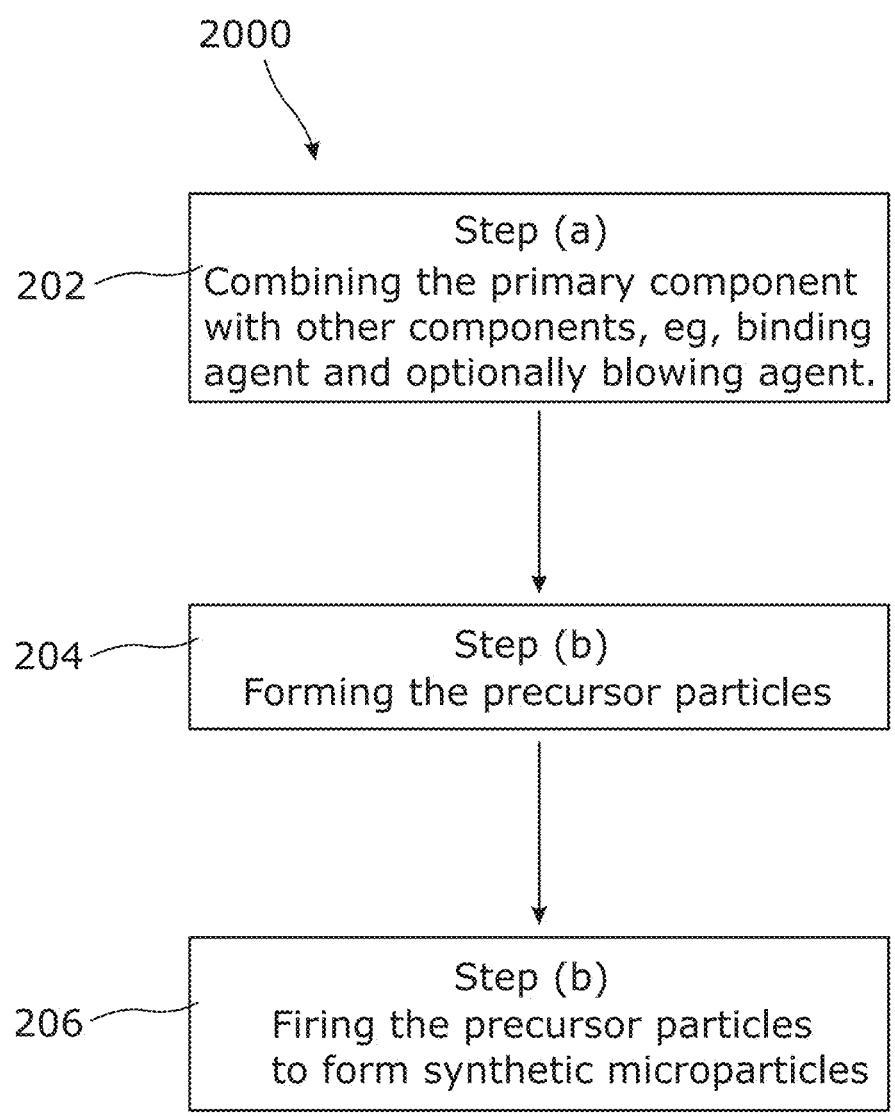
FIG. 2 is a schematic illustration of one method of producing one embodiment of the precursor of the disclosure.

Method of Forming Agglomerate Precursor:

As described above, preferred embodiments of the present disclosure also provide methods of preparing an agglomerate precursor that is suitable for forming a synthetic microparticle therefrom. FIG. 2 provides a schematic illustration of one preferred method 2000 of forming the agglomerate precursor and synthetic microparticle of the disclosure.

As shown in FIG. 2, the method 2000 begins with Step (a) 202, which comprises providing a primary component of a predetermined size and combining it with other component materials including the binding agent and optionally the blowing agent. Preferably, the primary component comprises at least one aluminosilicate material. Preferably, the amount of primary component is greater than about 40 wt. % based on the total dry weight of the agglomerate precursor. Preferably, the amount of binding agent is in the range of about 0.1 to about 30 wt. %, based on the total dry weight of the agglomerate precursor. Preferably, the amount of blowing agent is less than about 10 wt. % based on the total dry weight of the agglomerate precursor. Step (a) 202 comprises mixing the primary component with the binding agent and blowing agent in water.

Other additives (e.g. surfactants) may also be added in Step (a) 202, as appropriate. Surfactants may used to assist with combining, mixing, suspending and dispersing the particles. Typically, step (a) 202 provides an aqueous dispersion or paste, which is dried in subsequent steps. Combining can be performed by any conventional means, such that those used to blend ceramic powders.

Examples of preferred combining or mixing techniques include, but are not limited to, agitated tanks, ball mills, single and twin screw mixers, and attrition mills.

Subsequent to the combining process in Step (a) 202, the method 2000 continues with Step (b) 204, in which the precursor particles are formed. The step of forming the precursor particles includes drying the combination of primary components and other components from step (a) 202. Drying may be performed at a temperature in the range of about 30 to about 600° C. and may occur over a period of up to about 48 hours. It is to be understood that the drying time is dependent on the drying technique employed. Any type of dryer customarily used in industry to dry slurries and pastes may be used. Drying may be performed in a batch process using, for example, a stationary dish or container. Alternatively, drying may be performed in a fluid bed dryer, rotary dryer, rotating tray dryer, spray dryer or flash dryer. Alternatively, drying may also be performed using a microwave oven. Accordingly, it will be readily appreciated that the optimum drying period will depend on the type of drying method employed.

When drying is performed in a stationary dish or container, it is preferred that the drying temperature is initially not set too high in order to avoid water in the mixture boiling violently and thus forcefully ejecting solids out of the drying container. In this case, the drying temperature, at least initially, is preferably in the range of about 30 to about 100° C., and more preferably about 40 to about 80° C. to avoid initial, rapid boiling of water. However, after initial evaporation of water, the drying temperature may be increased to temperatures up to about 350° C., which completes the drying process more speedily.

As shown in FIG. 2, step (b) 204 of method 2000 of forming the agglomerate precursor further includes comminuting the dried mixture from Step (a) 202 to form agglomerate precursor particles of a predetermined particle diameter range. However, in some embodiments of the disclosure, the drying component and comminuting component of Step (b) 204 may be performed in a single action. Preferably, the dried mixture is comminuted to provide agglomerate precursor particles having an average particle diameter in the range of about 10 to about 1000 microns, more preferably about 30 to about 1000 microns, more preferably about 40 to about 500 microns, and more preferably about 50 to about 300 microns. The particle diameter of the agglomerate precursor will affect the particle diameter of the resultant synthetic hollow microsphere, although the degree of correspondence will, of course, only be approximate.

Preferred embodiments of the present disclosure provide for synthetic hollow microspheres having a controlled particle diameter distribution. Accordingly, the comminuted agglomerate precursor may be classified to a predetermined particle diameter distribution. Alternatively, a controlled particle diameter distribution in the agglomerate precursor may be achieved by the use of spray dryer in the drying Step (b) 204. Spray drying has the additional advantage of allowing a high throughput of material and fast drying times. Hence, in one preferred embodiment of the present disclosure, the drying Step (b) 204 is performed using a spray dryer. Spray dryers are described in a number of standard textbooks (e.g. Industrial Drying Equipment, C. M. van't Land; Handbook of Industrial Drying 2nd Edition, Arun S. Mujumbar) and will be well known to the skilled person. For example, spray dryers such as a Bowen Engineering, Inc. No. 1 Ceramic Dryer fitted with a two-fluid nozzle type 59-BS can be used. The use of a spray dryer in the present disclosure has been found to substantially eliminate the need for any sizing/classification of the agglomerate precursor.

In one embodiment of the disclosure, the aqueous mixture formed at step (a) 202 being fed to a spray dryer at step (b) 204 comprises about 20 to about 90 wt. % solids, more preferably about 25 to about 75 wt. % solids, and more preferably about 60 to about 70 wt. % solids. In addition to the agglomerate ingredients described above, the aqueous mixture from step (a) 202 may contain further processing aids or additives to improve mixing, flowability or droplet formation in the spray dryer. Suitable additives are well known in the spray drying art. Examples of such additives are sulphonates, glycol ethers, hydrocarbons, cellulose ethers and the like. These may be contained in the aqueous slurry in an amount ranging from about 0 to about 5 wt. %.

In the spray drying process, the aqueous mixture from step (a) 202 is typically pumped to an atomizer at a predetermined pressure and temperature to form droplets. The atomizer may be, for example, an atomizer based on a rotating disc (centrifugal atomization), a pressure nozzle (hydraulic atomization), or a two-fluid pressure nozzle wherein the aqueous mixture from step (a) 202 is mixed with another fluid (pneumatic atomization). The pressure nozzle can have an air nozzle pressure of about 10 psi, about 15 psi, about 20 psi, about 25 psi, about 30 psi, etc. The atomizer may also be subjected to cyclic mechanical or sonic pulses. The atomization may be performed from the top or from the bottom of the dryer chamber. The hot drying gas may be injected into the dryer co-current or counter-current to the direction of the spraying.

The atomized droplets of mixture from step (a) 202 are dried in the spray dryer for a predetermined residence time. Typically, the residence time in the spray dryer is in the range of about 0.1 to about 10 seconds, with relatively long residence times of greater than about 2 seconds being generally more preferred. Preferably, the inlet temperature in the spray dryer is in the range of about 300 to about 600° C. and the outlet temperature is in the range of about 100 to about 220° C.

The final step of the method is step (c) 206, wherein the agglomerate precursor particles are fired at a pre-determined temperature profile sufficient to activate the blowing agent to release a blowing gas, thereby forming a microsphere with at least one substantially enclosed void. In the embodiment of the disclosure used forming solid synthetic microspheres, the agglomerate precursor is fired at a pre-determined temperature profile that will adequately combine the primary component with the binding agent.

In certain preferred embodiments, the temperature profile used in the firing step substantially fuses the precursor into a melt, reduces the viscosity of the melt, seals the surface of the precursor and promotes expansive formation of gas within the melt to form bubbles. The temperature profile preferably should maintain the melt at a temperature and time sufficient to allow gas bubbles to coalesce and form a primary void. After foaming or formation of the primary void, the newly expanded particles are rapidly cooled, thus forming hollow glassy microspheres. In one embodiment, the temperature profile is preferably provided by a furnace having one or more temperature zones, such as a drop tube furnace, a vortex type furnace, a fluidized bed furnace or a fuel fired furnace, with upward or downward draft air streams. A fuel fired furnace used in certain preferred embodiments of the present disclosure includes furnace types in which agglomerated precursors are introduced directly into one or a multitude of combustion zones, to cause expansion or blowing of the particles. This is a preferred type of furnace, since the particles benefit by direct rapid heating to high temperatures, which is desirable. The heat source may be electric or provided by burning fossil fuels, such as natural gas or fuel oil. One preferred method of heating is by combustion of natural gas, since this is more economical than electric heating and cleaner than burning fuel oil.

Typically, the peak firing temperature in the firing step is in the range of about 600 to about 2500° C., more preferably about 800 to about 2000° C., more preferably about 1000 to about 1500° C., and more preferably about 1100 to about 1400° C. However, it will be appreciated that the requisite temperature profile will typically depend on the type of aluminosilicate primary component and blowing agent used. Preferably, the exposure time to the peak firing temperatures described above will be for a period of about 0.05 to about 20 seconds, more preferably about 0.1 to about 10 seconds.

Use of Synthetic Hollow Microspheres

The synthetic hollow microspheres according to preferred embodiments of the present disclosure may be used in a wide variety of applications, for example, in filler applications, modifier applications, containment applications or substrate applications. The scope of applications is much greater than that of harvested cenospheres due to the low cost and consistent properties of synthetic microspheres.

Synthetic microspheres according to the present disclosure may be used as fillers in composite materials, where they impart properties of cost reduction, weight reduction, improved processing, performance enhancement, improved machinability and/or improved workability.

More specifically, the synthetic microparticles may be used as fillers in polymers (including thermoset, thermoplastic, and inorganic geopolymers), inorganic cementitious materials (including material comprising Portland cement, lime cement, alumina-based cements, plaster, phosphate-based cements, magnesia-based cements and other hydraulically settable binders), concrete systems (including precise concrete structures, tilt up concrete panels, columns, suspended concrete structures etc.), putties (e.g. for void filling and patching applications), wood composites (including particleboards, fibreboards, wood/polymer composites and other composite wood structures), clays, and ceramics. One particularly preferred use of the microspheres according to the present disclosure is in fiber cement building products.

The synthetic microparticles may also be used as modifiers in combination with other materials. By appropriate selection of size and geometry, the microparticles may be combined with certain materials to provide unique characteristics, such as increased film thickness, improved distribution, improved flowability etc. Typical modifier applications include light reflecting applications (e.g. highway markers and signs), industrial explosives, blast energy absorbing structures (e.g. for absorbing the energy of bombs and explosives), paints and powder coating applications, grinding and blasting applications, earth drilling applications (e.g. cements for oil well drilling), adhesive formulations and acoustic or thermal insulating applications.

The synthetic microspheres may also be used to provide specific surface activities in various applications where surface reactions are used (i.e. substrate applications). Surface activities may be further improved by subjecting the synthetic microparticles to secondary treatments, such as metal or ceramic coating, acid leaching etc. Typical substrate applications include ion exchange applications (for removing contaminants from a fluid), catalytic applications (in which the surface of the microparticle is treated to serve as a catalyst in synthetic, conversion or decomposition reactions), filtration (where contaminants are removed from gas or liquid streams), conductive fillers or RF shielding fillers for polymer composites, and medical imaging.

In one embodiment, the synthetic microparticles of preferred embodiments of the present disclosure are incorporated in a building material. The synthetic microparticles can be incorporated in a composite building material as an additive, low density filler, and/or the like. In one embodiment, the synthetic microparticles in the form of synthetic hollow microspheres are incorporated in a cementitious material. Due in large part to the low alkali metal content (e.g. less than about 3 atomic %) of the synthetic microspheres, the microspheres are substantially chemically inert when in contact with the caustic cementitious material.

The synthetic microspheres of preferred embodiments can be incorporated in a building material formulation comprising a hydraulic binder, and one or more fibers (e.g. cellulose fibers). Advantageously, the synthetic microspheres can serve as a substitute for harvested cenospheres in all applications because of the synthetic microspheres have substantially the same properties as the cenospheres.

However, in certain embodiments, the synthetic microparticles can be manufactured with properties that are superior to that of harvested cenospheres. For example, in some embodiments, the average aspect ratio of the synthetic microspheres is closer to 1 than the average aspect ratio of natural cenospheres, thus providing a microsphere that is more spherical. Moreover, in some embodiments, the average standard deviation of the wall thickness of the synthetic hollow microspheres is less than that of cenospheres, which provides a product with a more uniform appearance. These improved properties are achieved through controlling the processing conditions and raw material in manufacturing the microspheres.

The following examples illustrate some preferred methods of making the synthetic hollow microspheres of preferred embodiments of the present disclosure.

Example 1

This example shows a range of formulations of agglomerated precursor particles made with Borax according to embodiments of the present disclosure. Precursor component compositions are shown in Table 4A and agglomerated precursor compositions are shown in Table 4B. To form a precursor particle into a fired microparticle, a furnace temperature was used with the given furnace conditions: max temperature 1500° C., residence time 0.3 to 3 sec., and a firing atmosphere listed in Table 3.

TABLE 3

| | Firing Atmosphere | | | | |
|---|---|---|---|---|---|
| Equivalence Ratio | O2 | N2 | CO2 | CH4 | H2O |
| mol fraction | 0% | 70.82% | 9.41% | 0.94% | 18.82% |

TABLE 4A

| Raw Material composition | Component 1 | component 2 | Binder weight % | Blowing Agent | Additive |
|---|---|---|---|---|---|
| Oxide | | | | | |
| SiO2 | 58.6 | 52.3 | | | |
| Al2O3 | 22.9 | 12.4 | | | |
| B2O3 | | | 36.5 | | |
| Na2O | 2 | 1.8 | 16.3 | | |
| K2O | 1.1 | 4.7 | | | |
| Li2O | 0 | 0 | | | |
| MgO | 1.3 | 4.8 | | | |
| CaO | 5.7 | 6.7 | | | |
| BaO | 0.3 | 0.07 | | | |
| Fe2O3 | 5.1 | 4.4 | | | |
| TiO2 | 1.1 | | | | |
| Other | | | | | 100 |
| SiC | | | | 100 | |
| H2O - bound | | 11.7 | 47.2 | | |

TABLE 4B

| | Formula 1 | Formula 2 wt % | Formula 3 |
|---|---|---|---|
| PRECURSOR (after spray drying) | | | |
| Component 1 | 87 | 43.5 | 65 |
| component 2 | 0 | 43.5 | 22 |
| Binder | 10 | 10 | 10 |
| Blowing agent | 2 | 2 | 2 |
| Additive | 1 | 1 | 1 |
| expressed as oxides | | | |
| SiO2 | 54.1 | 54.1 | 54.1 |
| Al2O3 | 21.1 | 17.2 | 19.2 |
| B2O3 | 3.9 | 4.1 | 4.0 |
| Na2O | 3.6 | 3.7 | 3.6 |
| K2O | 1.0 | 2.8 | 1.9 |
| Li2O | 0.0 | 0.0 | 0.0 |
| MgO | 1.2 | 3.0 | 2.1 |
| CaO | 5.3 | 6.0 | 5.6 |
| BaO | 0.3 | 0.2 | 0.2 |
| Fe2O3 | 4.7 | 4.6 | 4.7 |
| TiO2 | 1.0 | 0.5 | 0.8 |
| Other - oxide | 2 | 2 | 2 |
| Other - non-oxide | 2 | 2 | 2 |

Example 2

Another embodiment of synthetic microparticles according to the present disclosure is shown in Table 5. This example shows analysis of synthetic microparticles in the form of synthetic hollow microspheres manufactured from precursor formulations provided in previous example, according to the present disclosure.

TABLE 5

| Microparticles | Formula 1 | Formula 2 atomic % | Formula 3 |
|---|---|---|---|
| O | 62.78 | 62.05 | 62.42 |
| Si | 19.01 | 19.14 | 19.08 |
| Al | 8.74 | 7.17 | 7.97 |
| B | 2.35 | 2.50 | 2.42 |
| Na | 2.4 | 2.5 | 2.5 |
| K | 0.5 | 1.3 | 0.9 |
| Li | 0.0 | 0.0 | 0.0 |
| Mg | 0.6 | 1.6 | 1.1 |
| Ca | 2.0 | 2.3 | 2.1 |
| Ba | 0.0 | 0.0 | 0.0 |
| Fe | 1.3 | 1.3 | 1.3 |
| Ti | 0.3 | 0.1 | 0.2 |
| Other | 0.5 | 0.5 | 0.5 |
| O:Si | 3.3 | 3.2 | 3.3 |
| Total Divalent | 2.7 | 3.9 | 3.3 |
| Total Monovalent | 2.9 | 3.8 | 3.3 |
| Total trivalent | 12.40 | 10.97 | 11.70 |

The microparticle size can have a wall thickness of about 1 to 100 microns, preferably from about 5 to about 15 microns, more preferably from about 3.13 to about 94 microns. The wall thickness can range from about 5% to about 15% of the diameter of the microparticles. The diameters of the microparticles can range from about 30 to about 1000 microns. Diameters of different microparticles can range from about 50 to about 115 microns, from about 125 to about 225 microns, from about 225 to about 375 microns and from about 400 to about 500 microns.

Example 3

This example shows typical spray drying conditions used to produce agglomerate precursors in certain preferred embodiments of the present disclosure.

Dryer: Bowen Engineering, Inc. No 1 Ceramic Dryer fitted with a two-fluid nozzle type 59-BS Air nozzle pressure: about 20 psi
Cyclone vacuum: about 4.5
Inlet/Outlet temperature: about 550° C./120° C.
Chamber vacuum: about 1.6
Slurry solids: about 50%

Agglomerate precursors produced using these spray drying conditions had a suitable average particle diameter and particle diameter distribution for forming synthetic hollow microspheres therefrom.

Agglomerate precursors produced using these spray drying conditions had a suitable average particle diameter and particle diameter distribution for forming synthetic microparticles in the form of synthetic hollow microspheres therefrom.

One preferred method of the present disclosure advantageously provides a means for producing synthetic microparticles in the form of synthetic hollow microspheres in high yield from widely available and inexpensive starting materials, such as some forms of fly ash, and minerals. Hence, the method, in its preferred forms, reduces the overall cost of producing microspheres, and consequently increases the scope for their use, especially in the building industry where the use of presently available cenospheres is relatively limited due to their prohibitive cost and low availability. Hitherto, it was not believed that hollow microspheres could be formed synthetically from a precursor composition substantially free from monovalent and divalent metal elements.

A further advantage of one embodiment of the present disclosure, in its preferred form, is that the synthetic microparticles produced may be tailor-made to suit a particular purpose. For example, the size, density and composition of the microparticles may be modified, as desired, by modifying the relative amounts of ingredients and/or the temperature profile/exposure time during formation.

Still a further advantage of one embodiment of the present disclosure, in its preferred form, is that the synthetic microparticles produced have acceptably high chemical durability and can withstand, for example, a highly caustic environment of pH about 12 to about 14 for up to about 48 hours. Thus, synthetic microparticles produced according to one preferred embodiment of the present disclosure can withstand aqueous cementitious environments, such as Portland cement paste.

Moreover, when used as a density modifying filler in fiber cement compositions, the compositions are cured for up to 24 hours in an autoclave that is maintained at temperatures as high as 250° C. Synthetic microparticles produced according to one preferred embodiment of the present disclosure lose minimal amount of mass to dissolution, such as by leaching of components materials, retain their shape, and continue to have high mechanical strength in fiber cement products, even after exposure to harsh autoclaving conditions.

It will be appreciated that embodiments of the present disclosure have been described by way of example only and the modifications of detail within the scope of the disclosure will be readily apparent to those skilled in the art.

Although the foregoing descriptions of certain preferred embodiments of the present disclosure have shown, described and pointed out some fundamental novel features of the disclosure, it will be understood that various omissions, substitutions, and changes in the form of the detail of the apparatus as illustrated as well as the uses thereof, may be made by those skilled in the art, without departing from the spirit of the disclosure. Consequently, the scope of the present disclosure should not be limited to the foregoing discussions.

What is claimed is:

1. A synthetic microparticle having a mean diameter of about 110 μm to 1000 μm, and an aspect ratio of about 0.8:1 to about 1:1, further comprising:
   about 15% to about 95% $SiO_2$ by weight;
   about 2% to about 45% $Al_2O_3$ by weight;
   about 0% to about 1.8% $Na_2O$ by weight;
   about 0.5% to about 10% $B_2O_3$ by weight;
   at least one internal void; and
   a total O:Si ratio of at least 3.

2. A synthetic microparticle according to claim 1, the microparticle comprising about 0.1% to about 1.8% $Na_2O$ by weight.

3. A synthetic microparticle according to claim 1, the microparticle comprising about 0.1% to about 5% $B_2O_3$ by weight.

4. A synthetic microparticle according to claim 1, wherein the microparticle comprises a solid phase.

5. A synthetic microparticle according to claim 1, wherein the microparticle comprises an amorphous solid phase.

6. A synthetic microparticle according to claim 1, wherein the microparticle comprises a crystalline solid phase.

7. A synthetic microparticle according to claim 1, wherein at least the microparticle comprises a fluid phase.

8. A synthetic microparticle according to claim 7, wherein at least one fluid phase is a gas.

9. A synthetic microparticle according to claim 1, wherein the microparticle bulk density is less than about 2.0 gm/cc.

10. A cementitious material, comprising:
a cementitious matrix; and
a plurality of synthetic microparticles according to claim 1.

* * * * *